US009698716B2

(12) United States Patent
Tobari et al.

(10) Patent No.: US 9,698,716 B2
(45) Date of Patent: Jul. 4, 2017

(54) MOTOR CONTROL DEVICE AND WORK MACHINE USING THE SAME

(75) Inventors: Kazuaki Tobari, Tokyo (JP); Kazuya Sekine, Kasumigaura (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 446 days.

(21) Appl. No.: 14/239,286

(22) PCT Filed: Aug. 10, 2012

(86) PCT No.: PCT/JP2012/070556
§ 371 (c)(1),
(2), (4) Date: Feb. 18, 2014

(87) PCT Pub. No.: WO2013/024828
PCT Pub. Date: Feb. 21, 2013

(65) Prior Publication Data
US 2014/0176028 A1    Jun. 26, 2014

(30) Foreign Application Priority Data

Aug. 18, 2011  (JP) .................. 2011-179206
Mar. 27, 2012  (JP) .................. 2012-072204

(51) Int. Cl.
*H02P 21/14*   (2016.01)
*B60L 15/20*   (2006.01)
(Continued)

(52) U.S. Cl.
CPC .......... *H02P 21/148* (2013.01); *B60L 3/003* (2013.01); *B60L 7/14* (2013.01); *B60L 11/1861* (2013.01);
(Continued)

(58) Field of Classification Search
USPC ................................... 318/400.02
See application file for complete search history.

(56) References Cited

U.S. PATENT DOCUMENTS 6,321,606 B1 * 11/2001 Ishii ................ H02P 21/10
                                                73/862.193
6,462,491 B1 * 10/2002 Iijima ............... H02P 9/18
                                                318/400.09
(Continued)

FOREIGN PATENT DOCUMENTS

JP    2006-311770    11/2006
JP    2007-159368    6/2007
(Continued)

OTHER PUBLICATIONS

Extended European Search Report, mailed Dec. 8, 2015, which issued during the prosecution of European Patent Application No. 12823983.7, which corresponds to the present application.

*Primary Examiner* — Eduardo Colon Santana
*Assistant Examiner* — Said Bouziane
(74) *Attorney, Agent, or Firm* — Baker Botts L.L.P.

(57) ABSTRACT

The controller estimates torque output by the motor and controls the current supplied to the motor in such a manner that a torque estimate of the motor obtained by the estimation corresponds to the torque command value. A torque estimation calculator 120 estimates the torque output by the motor. A phase error command calculator 125 calculates a command value of a phase error from the deviation between the torque estimate and a torque command value. A speed estimation calculator 130 outputs a speed estimate in such a manner that a phase error estimate corresponds to the command value of the phase error.

4 Claims, 20 Drawing Sheets

(51) Int. Cl.
*B60L 3/00* (2006.01)
*B60L 7/14* (2006.01)
*B60L 11/18* (2006.01)
*H02P 21/18* (2016.01)
*H02P 21/20* (2016.01)
*H02P 27/04* (2016.01)
*H02P 6/08* (2016.01)

(52) U.S. Cl.
CPC ........... *B60L 15/20* (2013.01); *B60L 15/2009* (2013.01); *H02P 21/18* (2016.02); *H02P 21/20* (2016.02); *B60L 2200/40* (2013.01); *B60L 2200/42* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2260/44* (2013.01); *Y02T 10/645* (2013.01); *Y02T 10/7005* (2013.01); *Y02T 10/705* (2013.01); *Y02T 10/7044* (2013.01); *Y02T 10/7241* (2013.01); *Y02T 10/7275* (2013.01)

(56) References Cited

U.S. PATENT DOCUMENTS

| | | | | |
|---|---|---|---|---|
| 6,677,724 | B1 * | 1/2004 | Kim | H02P 6/18 318/700 |
| 6,984,957 | B2 * | 1/2006 | Tajima | B60K 6/26 318/400.02 |
| 8,963,460 | B2 * | 2/2015 | Li | H02P 6/145 318/400.02 |
| 2007/0159131 | A1 * | 7/2007 | Kitanaka | H02P 21/16 318/807 |
| 2008/0048606 | A1 * | 2/2008 | Tobari | H02P 21/145 318/801 |
| 2009/0140674 | A1 * | 6/2009 | Nakatsugawa | H02P 21/14 318/400.02 |
| 2009/0237013 | A1 * | 9/2009 | Sato | B60L 15/025 318/400.02 |
| 2009/0251096 | A1 * | 10/2009 | Schulz | H02P 6/10 318/801 |
| 2009/0322262 | A1 * | 12/2009 | Tobari | H02P 21/146 318/400.02 |
| 2010/0148707 | A1 * | 6/2010 | Tobari | H02P 6/085 318/400.02 |
| 2010/0156330 | A1 * | 6/2010 | Inoue | B60L 11/14 318/400.02 |
| 2011/0248656 | A1 * | 10/2011 | Yabuguchi | H02P 21/06 318/400.02 |
| 2012/0176069 | A1 * | 7/2012 | Sagami | B62D 5/0487 318/400.02 |

FOREIGN PATENT DOCUMENTS

| | | |
|---|---|---|
| JP | 2009-124811 | 6/2009 |
| JP | 2009-136085 | 6/2009 |
| JP | 2009-290929 | 12/2009 |
| JP | 2010-63336 | 3/2010 |
| JP | 2010-142031 A | 6/2010 |

* cited by examiner

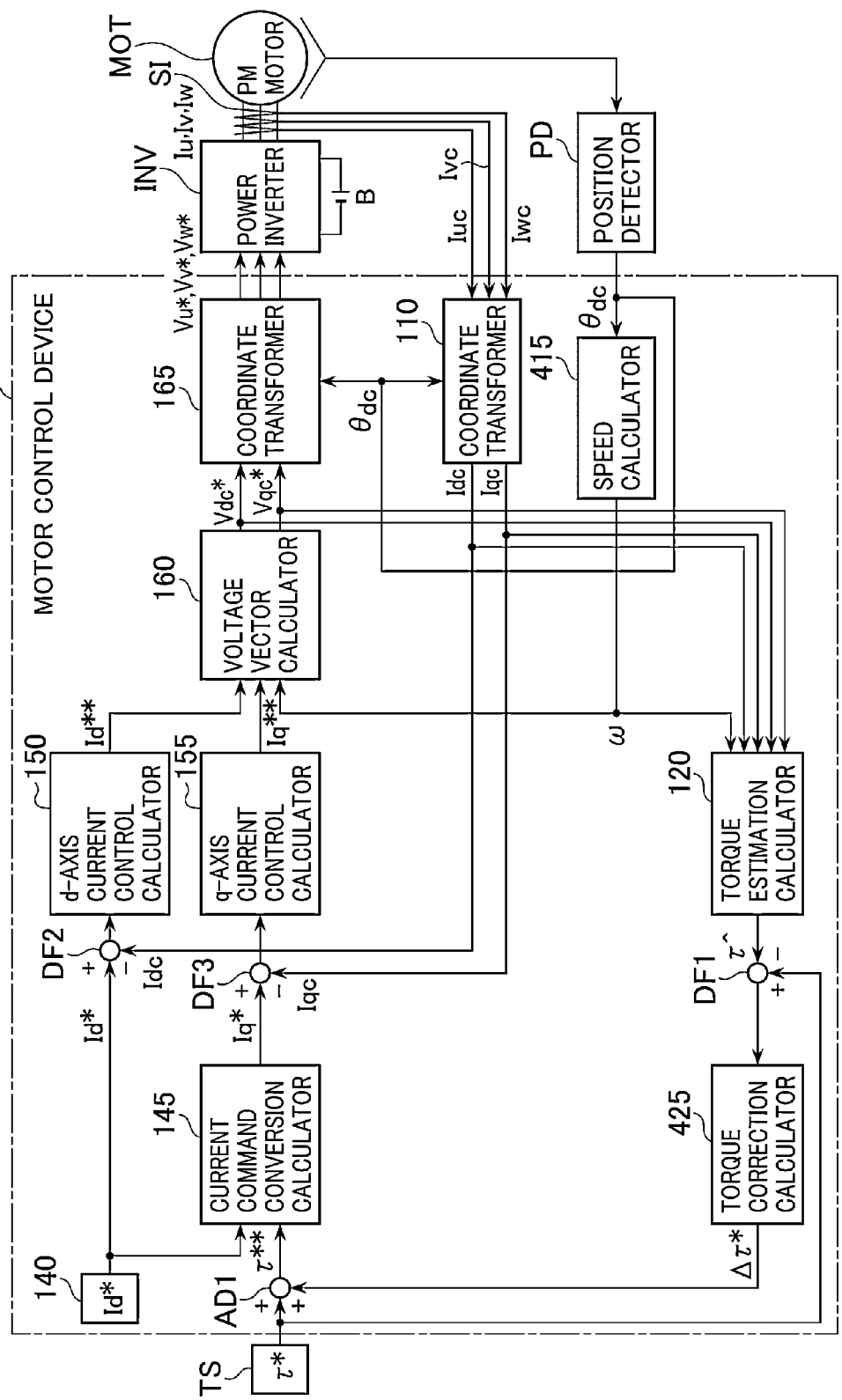

MOTOR CONTROL DEVICE AND WORK MACHINE USING THE SAME

TECHNICAL FIELD

The present invention relates to a motor control device and a work machine using the same, and more particularly to the motor control device suitable for torque control of a permanent magnet synchronous motor and a work machine using it.

BACKGROUND ART

The conventionally-known motor control device for torque control includes a motor constant calculator to calculate electric constants of a motor and corrects setting values of electric constants defined on one axis of orthogonal two axes (d-axis and q-axis) by a function expression using state variables defined on the same axis and by another function expression using state variables defined on the other axis (refer to e.g. patent document 1).

With this system the electric constants of a permanent magnet synchronous motor can be set more easily. As a result, by using the accurate electric constants to torque control, the torque control with higher accuracy is possible even when the torque is high, and the motor can be driven with high responsiveness and efficiency.

RELATED-ART DOCUMENT

Patent Document

Patent document 1: JP-2009-136085-A

SUMMARY OF THE INVENTION

Problems to be Solved by the Invention

However, the description of patent document 1 does not include any mention about an error including a setting of the motor constant. With a setting error in the motor constant, the accuracy of the torque control will decrease corresponding to the amount of this error.

An object of the present invention is to provide a motor control device that compensates an error including a setting error in a motor constant, thereby enabling torque control with high accuracy and a work machine using it.

Means to Solve the Problems (1) In order to achieve the above-described object, the present invention provides a motor control device having a controller that controls a current supplied to a motor in such a manner that a current command value obtained from a torque command value to the motor corresponds to a current detection value regarding the current supplied to the motor via a power inverter. The controller estimates torque output by the motor and controls the current supplied to the motor in such a manner that a torque estimate of the motor obtained by the estimation corresponds to the torque command value.

(2) In the above-described (1), preferably, the controller includes a torque estimation calculator that estimates the torque output by the motor, a voltage vector calculator, and a phase error estimation calculator. The voltage vector calculator calculates d-axis and q-axis voltage command values based on d-axis and q-axis current command values, d-axis and q-axis current detection values, a speed estimate, and a setting value of a motor constant. The phase error estimation calculator outputs a phase error estimate that is an estimate of a phase error as a deviation between an estimate of a rotational phase of the motor and a rotational phase value of the motor based on the d-axis and q-axis voltage command values output by the voltage vector calculator, the speed estimate, the d-axis and q-axis current detection values, and the setting value of the motor constant. The controller further includes a phase error command calculator that calculates a command value of the phase error from a deviation between the torque estimate obtained by the estimation by the torque estimation calculator and the torque command value, and a speed estimation calculator that outputs the speed estimate in such a manner that the phase error estimate output by the phase error estimation calculator corresponds to the command value of the phase error output by the phase error command calculator.

(3) In the above-described (2), preferably, the torque estimation calculator subtracts, from a first power signal obtained by adding the product of the d-axis voltage command value and the d-axis current detection value to the product of the q-axis voltage command value and the q-axis current detection value, a second power signal obtained by adding the square of the d-axis current detection value to the square of the q-axis current detection value and multiplying a value resulting from the addition by a resistance value of the motor, and the torque estimation calculator divides the value resulting from the subtraction by the speed estimate and multiples the result of the division by a constant to calculate the torque estimate.

(4) In the above-described (3), preferably, the phase error estimation calculator multiples, by an integral gain, the deviation between the torque estimate obtained by the estimation by the torque estimation calculator and the torque command value and performs an integral to calculate the command value of the phase error.

(5) In the above-described (2), preferably, the torque estimation calculator subtracts, from a first power signal obtained by multiplying a three-phase voltage command value to the power inverter by a three-phase current detection value for each of three phases and adding the products of the multiplication to each other, a second power signal obtained by squaring the three-phase current detection value for each phase to add the squares to each other and multiplying a value resulting from the addition by a resistance value of the motor, and the torque estimation calculator divides a value resulting from the subtraction by the speed estimate and multiples the result of the division by a constant to calculate the torque estimate.

(6) In the above-described (2), preferably, the torque estimation calculator subtracts, from a first power signal obtained by multiplying a DC voltage and a DC current of the power inverter and multiplying the result of the multiplication by a constant, a second power signal obtained by adding the square of the d-axis current detection value to the square of the q-axis current detection value and multiplying the value resulting from the addition by a resistance value of the motor, and the torque estimation calculator divides the value resulting from the subtraction by the speed estimate and multiples the result of the division by a constant to calculate the torque estimate.

(7) In the above-described (1), preferably, the controller includes a torque estimation calculator that estimates the torque output by the motor, a voltage vector calculator that calculates d-axis and q-axis voltage command values based on d-axis and q-axis current command values, d-axis and q-axis current detection values, a speed estimate, and a setting value of a motor constant, and a q-axis inductance correction calculator that calculates a correction value of q-axis inductance from a deviation between the torque estimate obtained by the estimation by the torque estimation calculator and the torque command value. The controller further includes a phase error estimation calculator that outputs a phase error estimate that is an estimate of a phase error as a deviation between an estimate of a rotational phase of the motor and a rotational phase value of the motor based on the d-axis and q-axis voltage command values output by the voltage vector calculator, the speed estimate, the d-axis and q-axis current detection values, the setting value of the motor constant, and the correction value of the q-axis inductance, and a speed estimation calculator that outputs the speed estimate in such a manner that a command value of the phase error output by the phase error command calculator becomes zero.

(8) In the above-described (7), preferably, the q-axis inductance correction calculator multiples, by an integral gain, the deviation between the torque estimate obtained by the estimation by the torque estimation calculator and the torque command value and performs integral calculation to calculate the correction value of the q-axis inductance.

(9) In order to achieve the above-described object, the present invention provides a motor control device having a controller that controls a current supplied to a permanent magnet synchronous electric motor in such a manner that a current command value obtained from a torque command value to the permanent magnet synchronous electric motor corresponds to a current detection value regarding the current supplied to the permanent magnet synchronous electric motor via a power inverter. The motor control device carries out torque control of the permanent magnet synchronous electric motor. The controller calculates a second torque command value in such a manner that a torque estimate obtained from power information of the power inverter corresponds to a first torque command value given from an upper-level control device, and the controller carries out the torque control in accordance with the second torque command value.

With this configuration, an error including a setting error in a motor constant is compensated, thereby enabling torque control with high accuracy.

(10) In the above-described (9), preferably, and the controller includes a position detector that detects the magnetic pole position of the permanent magnet synchronous electric motor and performs a calculation of d-axis and q-axis voltage command values in accordance with a speed detection value calculated from the magnetic pole position detected by the position detector, d-axis and q-axis current command values obtained from the second torque command value, d-axis and q-axis current detection values, and a setting value of a motor constant to control an output voltage of the power inverter.

(11) In the above-described (9), preferably, the controller performs a calculation of d-axis and q-axis voltage command values in accordance with d-axis and q-axis current command values obtained from the second torque command value, d-axis and q-axis current detection values, a speed estimate, and a setting value of a motor constant to control an output voltage of the power inverter. The controller calculates the speed estimate in such a manner that a phase error as a deviation between a rotational phase estimate obtained by performing an integral of the speed estimate and a rotational phase value of the permanent magnet synchronous electric motor corresponds to a command value of the phase error.

(12) In the above-described (10), preferably, the controller includes a torque estimate calculator that calculates the torque estimate. The torque estimate calculator subtracts, from a first power signal obtained by adding the product of d-axis voltage command value and current detection value to the product of q-axis voltage command value and current detection value, a second power signal obtained by adding the square of the d-axis current detection value to the square of the q-axis current detection value and multiplying the value resulting from the addition by a resistance value of the permanent magnet synchronous electric motor, and the torque estimate calculator divides the value resulting from the subtraction by a speed estimate and multiples the result of the division by a constant to calculate the torque estimate.

(13) In the above-described (10), preferably, the controller includes a torque estimate calculator that calculates the torque estimate. The torque estimate calculator subtracts, from a first power signal obtained by multiplying a DC voltage and a DC current of the power inverter and multiplying the result of the multiplication by a constant, a second power signal obtained by squaring a three-phase current detection value for each phase to add the squares to each other and multiplying the value resulting from the addition by a resistance value of a motor, and the torque estimate calculator divides the value resulting from the subtraction by a speed estimate and multiples the result of the division by a constant to calculate the torque estimate.

(14) In the above-described (10), preferably, the controller includes a torque estimate calculator that calculates the torque estimate. The torque estimate calculator subtracts, from a first power signal obtained by multiplying a DC voltage and a DC current of the power inverter and multiplying the result of the multiplication by a constant, a second power signal obtained by adding the square of the d-axis current detection value to the square of the q-axis current detection value and multiplying the value resulting from the addition by a resistance value of the permanent magnet synchronous electric motor, and the torque estimate calculator divides the value resulting from the subtraction by a speed estimate and multiples the result of the division by a constant to calculate the torque estimate.

(15) In the above-described (9), preferably, a deviation between the first torque command value given from the upper-level control device and a torque output value is proportional to the square of a current value of the permanent magnet synchronous electric motor and is inversely proportional to electric motor speed.

(16) In order to achieve the above-described object, the present invention provides a work machine having a permanent magnet synchronous electric motor, a power inverter that converts a DC voltage to three-phase AC voltages to supply the three-phase AC voltages to the permanent magnet synchronous electric motor and varies the output torque of the permanent magnet synchronous electric motor, and a controller that controls a current supplied to the permanent magnet synchronous electric motor in such a manner that a current command value obtained from a torque command value to the permanent magnet synchronous electric motor corresponds to a current detection value regarding the current supplied to the permanent magnet synchronous electric motor via the power inverter. The controller calculates a second torque command value in such a manner that a torque estimate obtained from power information of the power inverter corresponds to a first torque command value given from an upper-level control device, and the controller carries out torque control in accordance with the second torque command value.

With this configuration, an error including a setting error in a motor constant is compensated, thereby enabling torque control with high accuracy.

(17) In the above-described (16), preferably, the work machine is a wheel loader including a motor for traveling driving that drives a wheel and an assist motor that assists an engine as the permanent magnet synchronous electric motor. A motor control device to control the motor for traveling driving includes the controller according to the above-described (10), and a motor control device to control the assist motor includes the controller according to the above-described (11).

(18) In the above-described (16), preferably, the work machine is a wheel loader including a motor for traveling driving that drives a wheel and an assist motor that assists an engine as the permanent magnet synchronous electric motor. A motor control device to control the motor for traveling driving and a motor control device to control the assist motor include the controller according to the above-described (10).

(19) In the above-described (16), preferably, the work machine is a hydraulic excavator including a revolving motor that revolves an upper revolving body relative to an undercarriage and an assist motor that assists an engine as the permanent magnet synchronous electric motor. A motor control device to control the revolving motor includes the controller according to the above-described (10), and a motor control device to control the assist motor includes the controller according to the above-described (11).

(20) In the above-described (16), preferably, the work machine is a hydraulic excavator including a revolving motor that revolves an upper revolving body relative to an undercarriage and an assist motor that assists an engine as the permanent magnet synchronous electric motor. A motor control device to control the revolving motor and a motor control device to control the assist motor include the controller according to the above-described (10).

Effect of the Invention

With the present invention, an error including a setting error in a motor constant is compensated, thereby enabling torque control with high accuracy.

BRIEF DESCRIPTION OF THE DRAWINGS

FIG. 14 explains the configuration of a motor drive system using a motor control device according to a fourth embodiment of the present invention.

MODES FOR CARRYING OUT THE INVENTION

The condition and operation of a motor control device according to a first embodiment of the present invention will be described below by using FIGS. 1 to 6.

First, the configuration of a motor drive system using the motor control device according to the present embodiment will be described by using FIG. 1.

Figure 1:
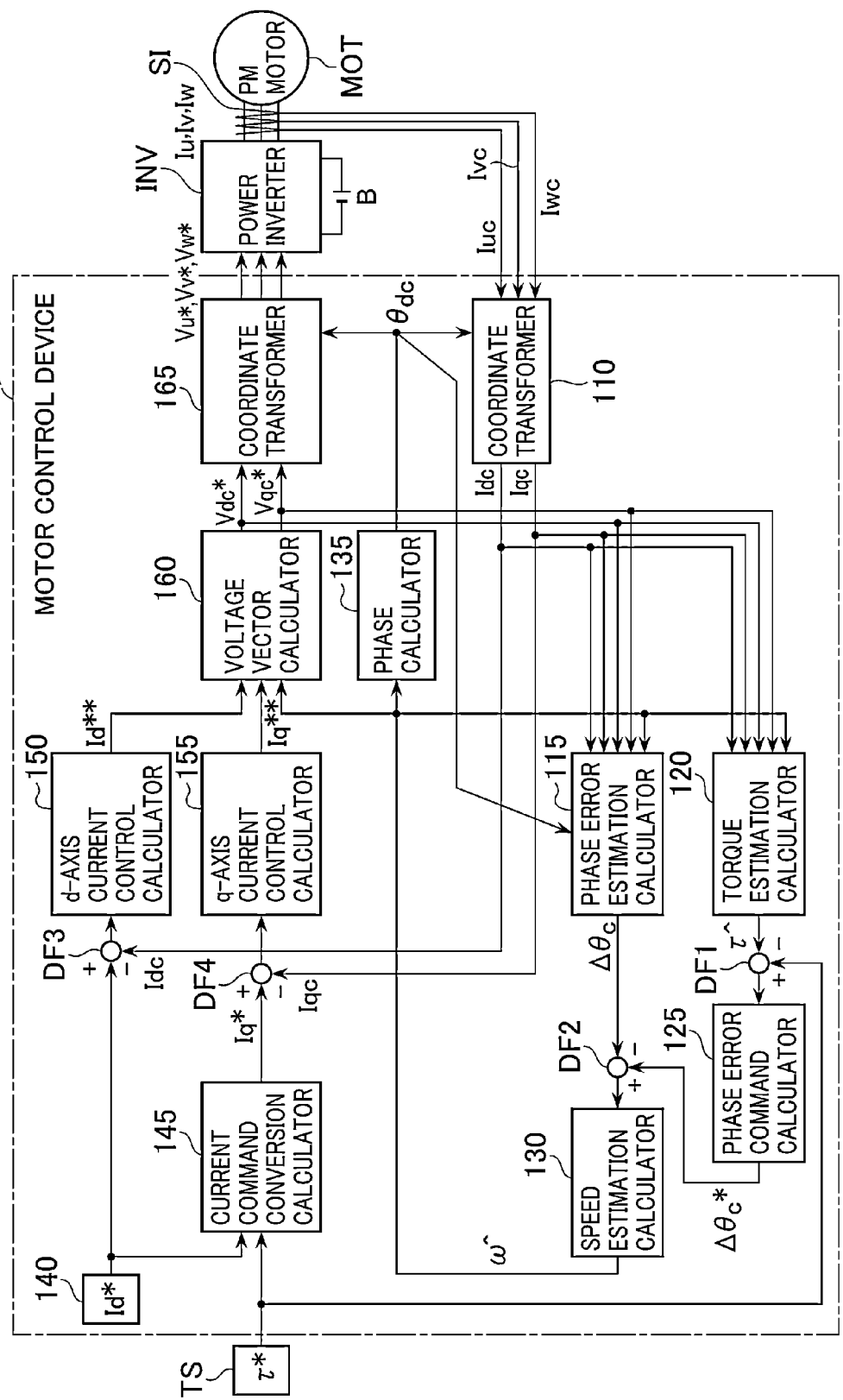
FIG. 1 explains the configuration of a motor drive system using a motor control device according to a first embodiment of the present invention.

FIG. 1 explains the configuration of the motor drive system using the motor control device according to the first embodiment of the present invention.

The motor drive system according to the present embodiment is composed of a motor control device 100, a power inverter INV, a permanent magnet synchronous motor (PM motor; AC motor) MOT, and a torque command setter TS.

The permanent magnet synchronous motor (PM motor; AC motor) MOT is composed of a rotor including a permanent magnet and a field winding and a stator including an armature winding. The permanent magnet synchronous motor MOT outputs torque obtained by combining a torque component by magnetic flux of the permanent magnet and a torque component by inductance of the armature winding. The permanent magnet synchronous motor MOT is a motor used for a work vehicle as described later by using FIG. 12. The motor control device 100 of the present embodiment is used for controlling such a motor MOT.

The power inverter INV converts a DC voltage supplied from a DC power supply B to three-phase AC voltages based on three-phase AC voltage command values (Vu*, Vv*, Vw*) and supplies them to the permanent magnet synchronous motor MOT to vary the output torque of the permanent magnet synchronous motor MOT.

A current detector SI detects three-phase AC currents (Iu, Iv, Iw) of the permanent magnet synchronous motor MOT.

The torque command setter TS outputs, to the motor control device 100, a torque command value $\tau^*$ as a command value of the torque output by the permanent magnet synchronous motor MOT. The torque command value $\tau^*$ is a value of "positive or negative polarity" including "zero." The torque command setter TS is included inside an upper-level control device for the motor control device 100.

The motor control device 100 includes a coordinate transformer 110, a phase error estimation calculator 115, a torque estimation calculator 120, a phase error command calculator 125, a speed estimation calculator 130, a phase calculator 135, a d-axis current command setter 140, a current command conversion calculator 145, a d-axis current control calculator 150, a q-axis current control calculator 155, a voltage vector calculator 160, a coordinate transformer 165, and difference calculators (DF1, DF2, DF3, DF4).

The coordinate transformer 110 outputs d-axis and q-axis current detection values (Idc, Iqc) from current detection values (Iuc, Ivc, Iwc) as detection values by the current detector SI regarding the three-phase AC currents (Iu, Iv, Iw) supplied to the permanent magnet synchronous motor MOT and an estimate θdc of the rotational phase estimated by the phase calculator 135.

The phase error estimation calculator 115 outputs a phase error estimate Δθc by estimation calculation of a phase error Δθ (=(θdc−θd)) as the deviation between the estimate θdc of the rotational phase and a rotational phase value θd of the permanent magnet synchronous motor MOT based on voltage command values (Vdc*, Vqc*) output by the voltage vector calculator 160, a speed estimate ω^ estimated by the speed estimation calculator 130, the current detection values (Idc, Iqc) output by the coordinate transformer 110, and preset electric constants (R, Ld, Lq, Ke) of the permanent magnet synchronous motor MOT. The electric constants (R, Ld, Lq, Ke) are held inside the phase error estimation calculator 115 as setting values. As the values of the electric constants (R, Ld, Lq, Ke), design values of the permanent magnet synchronous motor MOT to which the motor control device 100 of the present embodiment performs driving control are set and held. The values of the electric constants (R, Ld, Lq, Ke) of the individual permanent magnet synchronous motor MOT actually used are different from the design values of the electric constants (R, Ld, Lq, Ke) of the permanent magnet synchronous motor MOT. However, the error between these two values and the error from the setting value generated due to aging change in the electric constants (R, Ld, Lq, Ke) of the individual permanent magnet synchronous motor MOT are compensated by using the torque estimation calculator 120 and the phase error command calculator 125 to be described below.

The torque estimation calculator 120 performs estimation calculation of the output torque by using the voltage command values (Vdc*, Vqc*) output by the voltage vector calculator 160, the speed estimate ω^ estimated by the speed estimation calculator 130, and the current detection values (Idc, Iqc) output by the coordinate transformer 110, and outputs a torque estimate $\hat{\tau}$.

The difference calculator DF1 calculates the deviation ($\tau^* - \hat{\tau}$) between the torque command value $\tau^*$ output by the torque command setter TS and the torque estimate $\hat{\tau}$ calculated by the torque estimation calculator 120. The phase error command calculator 125 performs proportional-integral calculation of the deviation (τ*−τˆ) output by the difference calculator DF1 and outputs an output value thereof as a command value Δθc* of the phase error.

The difference calculator DF2 calculates and outputs the difference (Δθc*−Δθ) between the phase error Δθ output by the phase error estimation calculator 115 and the command value Δθc* of the phase error output by the phase error command calculator 125.

The speed estimation calculator 130 outputs the speed estimate ωˆ in such a manner that the difference (Δθc*−Δθ) output by the difference calculator DF2 becomes zero, that is, the estimate Δθc of the phase error output by the phase error command calculator 125 corresponds to the command value Δθc* of the phase error output by the phase error command calculator 125.

The state "the estimate Δθc of the phase error corresponds to the command value Δθc* of the phase error" here includes not only the case in which the command value Δθc* of the phase error and the estimate Δθc of the phase error strictly correspond to each other but also the case in which the estimate Δθc of the phase error is within a certain allowable range with respect to the command value Δθc* of the phase error.

The phase calculator 135 performs an integral of the speed estimate ωˆ calculated by the speed estimation calculator 130 and outputs the obtained estimate θdc of the rotational phase to the coordinate transformers 110 and 165.

The d-axis current command setter 140 outputs a d-axis current command value Id* as a value of "zero" or "negative polarity."

The current command conversion calculator 145 calculates a q-axis current command value Iq* by using the torque command value τ* from the torque command setter TS, the d-axis current command value Id* output by the d-axis current command setter 140, and the electric constants (Ld, Lq, Ke) of the permanent magnet synchronous motor MOT. The electric constants (Ld, Lq, Ke) are held inside the current command conversion calculator 145 as setting values. As the values of the electric constants (Ld, Lq, Ke), design values of the permanent magnet synchronous motor MOT for which driving control is performed by the motor control device 100 of the present embodiment are set and held.

The difference calculator DF3 calculates the deviation (Id*−Idc) between the first d-axis current command value Id* output by the d-axis current command setter 140 and the current detection value Idc output by the coordinate transformer 110.

The d-axis current control calculator 150 outputs a second d-axis current command value Id** from the deviation (Id*−Idc) calculated by the difference calculator DF3.

The difference calculator DF4 calculates the deviation (Iq*−Iqc) between the first q-axis current command value Iq* output by the current command conversion calculator 145 and the current detection value Iqc output by the coordinate transformer 110.

The q-axis current control calculator 155 outputs a second q-axis current command value Iq** from the deviation (Iq*−Iqc) calculated by the difference calculator DF4.

The voltage vector calculator 160 outputs the d-axis and q-axis voltage command values (Vdc*, Vqc*) based on the second d-axis current command value Id output by the d-axis current control calculator 150, the second q-axis current command value Iq output by the q-axis current control calculator 155, the speed estimate ωˆ, and the preset electric constants (R, Ld, Lq, Ke) of the permanent magnet synchronous motor MOT.

The coordinate transformer 165 outputs the three-phase AC voltage command values (Vu*, Vv*, Vw*) from the voltage command values (Vdc*, Vqc*) output by the voltage vector calculator 160 and the estimate θdc of the rotational phase estimated by the phase calculator 135.

That is, in the present embodiment, the current supplied to the motor is so controlled that the q-axis current command value Iq* obtained from the torque command value τ* to the motor and the preset d-axis current command value Id* correspond to the d-axis and q-axis current detection values (Idc, Iqc) regarding the currents (Iu, Iv, Iw) supplied to the motor via the power inverter. Here, the state "the d-axis and q-axis current command values (Id*, Iq*) correspond to the q-axis current detection values (Idc, Iqc)" includes not only the case in which the d-axis and q-axis current detection values (Idc, Iqc) and the d-axis and q-axis current command values (Id*, Iq*) strictly correspond to each other but also the case in which the d-axis and q-axis current command values (Id*, Iq*) are within a certain allowable range with respect to the d-axis and q-axis current detection values (Idc, Iqc). By the above feedback control, the current supplied to the motor is so controlled that the torque of the motor corresponds to the torque command value. However, if the motor constant involves an error, the torque value actually output from the motor will differ from the torque command value.

Next, the operation of the motor control device 100 of the present embodiment will be described. First, an explanation will be made about the basic operation of a position-sensorless control system when the "torque estimation calculator 120" and the "phase error command calculator 125", which are features of the present embodiment, are not used.

Output torque τ of the permanent magnet synchronous motor MOT can be shown by the following formula (1).

[Expression 1]

$$\tau = \frac{3}{2} \cdot Pm \cdot (Ke - (Ld - Lq) \cdot Id) \cdot Iq \qquad (1)$$

The parameters in this formula are as follows: Pm: the number of pole pairs, Ke: power generation coefficient, Ld: d-axis inductance, Lq: q-axis inductance, Id: d-axis current of the motor, and Iq: q-axis current of the motor.

In case of the phase error Δθ (=(θdc−θd)) which is the deviation between the estimate θdc of the rotational phase as the control axis and the rotational phase value θd as the motor axis is generated, a coordinate transformation matrix from the current detection values Idc and Iqc on the control axis ((dc−qc)-axis) to the motor currents Id and Iq on the motor axis ((d−q)-axis) is expressed by formula (2).

[Expression 2]

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} \qquad (2)$$

If the d-axis current command value Id* output by the d-axis current command setter 140 in FIG. 1 is set to "zero" (Id*=Idc=0) in formula (2) and the current control is performed, formula (2) becomes formula (3).

[Expression 3]

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \cdot \begin{bmatrix} 0 \\ Iqc \end{bmatrix} \quad (3)$$

If formula (3) is substituted into formula (1), which is the output torque formula, formula (4) is obtained.

[Expression 4]

$$\begin{aligned} \tau &= \frac{3}{2} \cdot Pm \cdot (Ke + (Ld - Lq) \cdot (-Iqc \cdot \sin\Delta\theta)) \cdot Iqc \cdot \cos\Delta\theta \\ &= \frac{3}{2} \cdot Pm \cdot \left( Ke \cdot Iqc \cdot \cos\Delta\theta - \frac{1}{2} \cdot (Ld - Lq) \cdot Iqc^2 \cdot \sin\Delta 2\theta \right) \end{aligned} \quad (4)$$

In general, the q-axis inductance Lq is in a relationship expressed by formula (5) with the d-axis inductance Ld.

[Expression 5]

$$Lq \geq Ld \quad (5)$$

Therefore, in formula (4), if the phase error $\Delta\theta$ occurs, the second term component of the output torque acts in the following direction.

when $\Delta\theta > 0$: increase direction when $\Delta\theta < 0$: decrease direction That is, if the phase error $\Delta\theta$ occurs with "negative polarity", the output torque $\tau$ decreases.

Meanwhile, the d-axis and q-axis voltage command values Vdc* and Vqc* calculated in the voltage vector calculator 160 in FIG. 1 by using the second d-axis and q-axis current command values Id and Iq, the speed estimate $\hat{\omega}$, and the setting values of the electric constants (R, Ld, Lq, Ke) are expressed by formula (6).

[Expression 6]

$$\begin{bmatrix} Vdc^* \\ Vqc^* \end{bmatrix} = \begin{bmatrix} R^* & -\hat{\omega} \cdot Lq^* \\ \hat{\omega} \cdot Ld^* & R^* \end{bmatrix} \cdot \begin{bmatrix} Id^{} \\ Iq^{} \end{bmatrix} + \begin{bmatrix} 0 \\ \hat{\omega} \cdot Ke^* \end{bmatrix} \quad (6)$$

If the phase error $\Delta\theta$ exists, applied voltages Vd and Vq of the motor calculated on the control side are expressed by formula (7).

[Expression 7]

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \cdot \left[ \begin{bmatrix} R^* & -\hat{\omega} \cdot Lq* \\ \hat{\omega} \cdot Ld* & R* \end{bmatrix} \cdot \begin{bmatrix} Id^{} \\ Iq^{} \end{bmatrix} + \begin{bmatrix} 0 \\ \hat{\omega} \cdot Ke* \end{bmatrix} \right] \quad (7)$$

On the other hand, when being expressed by using the phase error $\Delta\theta$, the current detection values Idc and Iqc, and the motor constants, the d-axis and q-axis motor-applied voltages Vd and Vq are shown by formula (8).

[Expression 8]

$$\begin{bmatrix} Vd \\ Vq \end{bmatrix} = \begin{bmatrix} R & -\omega \cdot Lq \\ \omega \cdot Ld & R \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} 0 \\ Iqc \end{bmatrix} + \begin{bmatrix} 0 \\ \omega \cdot Ke \end{bmatrix} \quad (8)$$

From a relationship of formula (7)=formula (8), when the d-axis current command value Id* is set to "zero" and a predetermined value is given as the q-axis current command value Iq*, the output values (Id, Iq) of the d-axis and q-axis current control calculators 150 and 155 are expressed by formula (9).

[Expression 9]

$$\begin{bmatrix} Id^{**} = \dfrac{c1 \cdot Iqc + c2}{2 \cdot (R^{*2} + Ld^* \cdot Lq^* \cdot \omega^{\wedge 2})} \\ Iq^{**} = \dfrac{c3 \cdot Iqc + c4}{2 \cdot (R^{*2} + Ld^* \cdot Lq^* \cdot \omega^{\wedge 2})} \end{bmatrix} \quad (9)$$

wherein $c1 = \omega^\wedge \cdot [2 \cdot R \cdot Lq^* - R^* \cdot (Ld + Lq)] +$
$\qquad \omega^\wedge \cdot (Ld - Lq) \cdot [-\omega^\wedge \cdot Lq^* \cdot \sin 2\Delta\theta + R^* \cdot \cos 2\Delta\theta]$ $c2 = 2 \cdot [-\omega^{\wedge 2} \cdot Lq^* \cdot Ke^* + \omega^\wedge \cdot Ke \cdot (R^* \cdot \sin\Delta\theta + \omega^\wedge \cdot Lq^* \cdot \cos\Delta\theta)]$ $c3 = 2 \cdot R \cdot R^* + \omega^{\wedge 2} \cdot Ld^* \cdot (Ld + Lq) -$
$\qquad \omega^\wedge \cdot (Ld - Lq) \cdot [R^* \cdot \sin 2\Delta\theta + \omega^\wedge \cdot Ld^* \cdot \cos 2\Delta\theta]$ $c4 = 2 \cdot [-\omega^\wedge \cdot R^* \cdot Ke^* + \omega^\wedge \cdot Ke \cdot (-\omega^\wedge \cdot Ld^* \cdot \sin\Delta\theta + R^* \cdot \cos\Delta\theta)]$ In the phase error estimation calculator 115, the phase error estimate $\Delta\theta c$ is calculated in accordance with formula (10) by using the d-axis and q-axis current detection values (Idc, Iqc), the speed estimate $\hat{\omega}$, and the motor constants.

[Expression 10]

$$\Delta\theta c = \tan^{-1}\left[ \frac{Vdc^* - R^* \cdot Idc + \omega^\wedge \cdot Lq^* \cdot Iqc}{Vqc^* - R^* \cdot Iqc + \omega^\wedge \cdot Lq^* \cdot Idc} \right] \quad (10)$$

If formula (6) and formula (9) are substituted into formula (10), formula (11) is obtained.

[Expression 11]

$$\Delta\theta c = \tan^{-1}\left[ \frac{\begin{array}{c} \omega^\wedge \cdot ([2 \cdot Lq^* - (Ld + Lq)] \cdot Iqc + \\ (Ld - Lq) \cdot Iqc \cdot \cos[2\Delta\theta] + 2Ke \cdot \sin[\Delta\theta]) \end{array}}{\begin{array}{c} 2 \cdot [(R - R^*) \cdot Iqc + \\ \omega^\wedge \cdot \cos[\Delta\theta](Ke - Iqc \cdot (Ld - Lq)\sin[\Delta\theta])] \end{array}} \right] \quad (11)$$

The speed estimation calculator 130 calculates the speed estimate $\hat{\omega}$ in such a manner that the estimate $\Delta\theta c$ of the phase error as the output value of the phase error estimation calculator 115 corresponds to the command value $\Delta\theta c^*$ (=0) of the phase error. At a constant speed, the numerator term of formula (11) is "zero" and thus formula (12) holds.

[Expression 12]

$$\hat{\omega} \cdot ([2 \cdot Lq^* - (Ld + Lq)] \cdot Iqc + (Ld - Lq) \cdot Iqc \cdot \cos[2\Delta\theta] + 2 \cdot Ke \cdot \sin[\Delta\theta]) = 0 \quad (12)$$

When formula (12) is deformed to express the phase error $\Delta\theta$, formula (13) can be obtained.

[Expression 13]

$$\Delta\theta = \sin^{-1}\left[\frac{Ke - \sqrt{Ke^2 + 4\cdot(Ld-Lq)\cdot(Lq^* - Lq)\cdot Iqc^2}}{2\cdot(Ld-Lq)\cdot Iqc}\right] \quad (13)$$

That is, if the q-axis inductance Lq changes in the decrease direction due to the application of the motor current, or the setting value Lq* of the motor constant about the q-axis inductance has an error, the phase error Δθ occurs because of the relationship of formula (13).

when Lq*>Lq: Δθ is "negative"
when Lq*<Lq: Δθ is "positive"

If the result of formula (13) is applied to formula (4), the output torque behaves as follows.

when Lq*>Lq, Δθ is "negative" and the output torque is in the decrease direction when Lq*<Lq, Δθ is "positive" and the output torque is in the increase direction The above-described torque decrease will be described by using FIG. 2.

FIG. 2 is an explanatory diagram of variation in the output torque in a motor drive system using a conventional motor control device.

An explanation will be made about the torque control characteristics when the "torque estimation calculator 120" and the "phase error command calculator 125", which are features of the present embodiment, are not used.

In the control device in FIG. 1, the command value Δθc* of the phase error is set to "0", and the setting value Lq* of the motor constant about the q-axis inductance, which is set in the "voltage vector calculator 160" and the "phase error estimation calculator 115", is set with a relationship of Lq*>Lq (direction of output torque decrease).

Figure 2A:
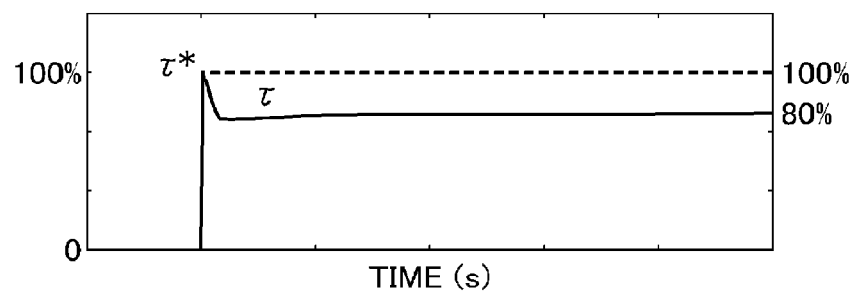
FIG. 2A is a diagram showing output torque when a torque command is step-changed to 100% in a motor drive system using a conventional motor control device.
Figure 2B:
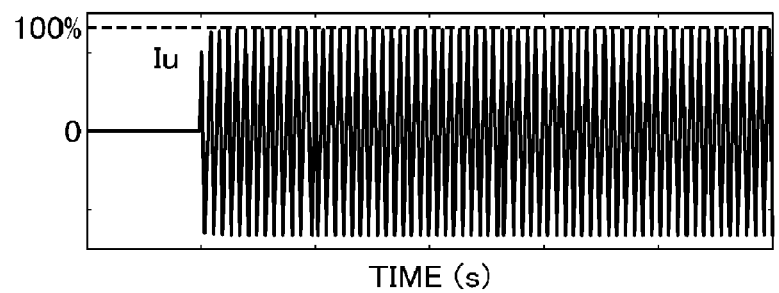
FIG. 2B is a diagram showing an AC motor current in the motor drive system using the conventional motor control device.
Figure 2C:
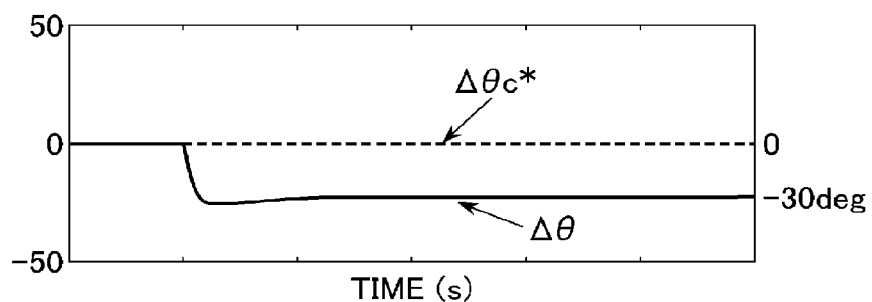
FIG. 2C is a diagram showing a relationship of a phase error in the motor drive system using the conventional motor control device.

FIG. 2(A) shows the output torque τ when the torque command τ* is step changed to 100%. FIG. 2(B) shows the AC motor current Iu, and FIG. 2(C) shows the relationship of the phase error Δθ.

Because the torque command τ* is given as 100% as shown by a dashed line in FIG. 2(A), the AC motor current Iu is also generated as 100% as shown in FIG. 2(B). However, the actual phase error Δθ constantly occurs by e.g. −30 (deg) as shown in FIG. 2(C). Therefore, the actual output torque τ decreases to e.g. 80% as shown in FIG. 2(A).

In contrast, in the present embodiment, high-accuracy torque control by which the output torque τ equal to the torque command τ* is obtained can be realized by introduction of the "torque estimation calculator 120" and the "phase error command calculator 125".

Next, an explanation will be made by using FIGS. 3 and 4 about the operation principle when the "torque estimation calculator 120" and the "phase error command calculator 125" are used in the motor control device according to the first embodiment of the present invention.

Figure 3:
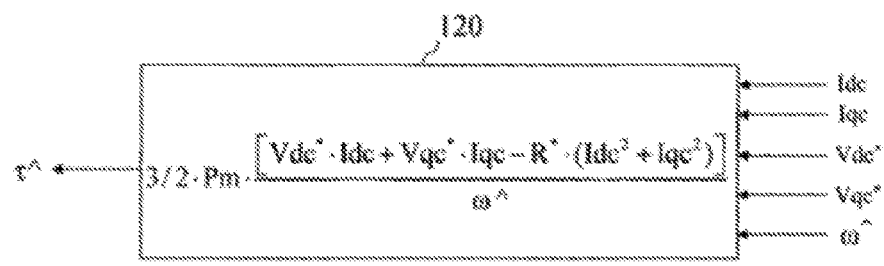
FIG. 3 is an explanatory diagram of the operation of a torque estimation calculator used in the motor control device according to the first embodiment of the present invention.

FIG. 3 is an explanatory diagram of the operation of the torque estimation calculator used in the motor control device according to the first embodiment of the present invention. FIG. 4 is an explanatory diagram of the operation of the phase error command calculator used in the motor control device according to the first embodiment of the present invention.

Active power P from the viewpoint of the magnetic flux axis of the motor is expressed by formula (14).

[Expression 14]

$$\begin{aligned}P &= Vd\cdot Id + Vq\cdot Iq \\ &= (R\cdot Id - \omega\cdot Lq\cdot Iq)\cdot Id + (R\cdot Iq + \omega\cdot Ld\cdot Id + \omega\cdot Ke)\cdot Iq \\ &= R\cdot(Id^2 + Iq^2) + \omega\cdot(Ld-Lq)\cdot Id\cdot Iq + \omega\cdot Ke\cdot Iq\end{aligned} \quad (14)$$

By substituting formula (3) into this, a calculated value Pc of the active power on the reference axis of the control can be obtained based on formula (15).

[Expression 15]

$$\begin{aligned}Pc &= R\cdot(Iqc^2\sin^2\Delta\theta + Iqc^2\cos^2\Delta\theta) - \omega\cdot(Ld-Lq)\cdot \\ &\quad (-Iqc^2\cdot\sin\Delta\theta\cdot\cos\Delta\theta) + \omega\cdot Ke\cdot Iqc\cdot\cos\Delta\theta \\ &= R\cdot Iqc^2 - \frac{1}{2}\cdot\omega\cdot(Ld-Lq)\cdot Iqc^2\cdot\sin2\Delta\theta + \\ &\quad \omega\cdot Ke\cdot Iqc\cdot\cos\Delta\theta\end{aligned} \quad (15)$$

The "torque estimation calculator 120" shown in FIG. 3 performs estimation calculation of the output torque τ by using the calculated value Pc of the active power of formula (15).

The torque estimation calculator 120 can estimate the output torque τ of formula (4) with high accuracy by performing a calculation of formula (16) in which a copper loss component (R×Iqc²) of the permanent magnet synchronous motor is subtracted from formula (15), the calculated value is divided by the speed estimate ω^, and then multiplied by a constant (3/2×Pm),

[Expression 16]

$$\begin{aligned}\tau^{\wedge} &= \frac{3}{2}\cdot Pm\cdot\frac{Pc - R^*\cdot Iqc^2}{\omega^{\wedge}} \\ &= \frac{3}{2}\cdot Pm\cdot\left(Ke\cdot Iqc\cdot\cos\Delta\theta - \frac{1}{2}\cdot(Ld-Lq)\cdot Iqc^2\cdot\sin2\Delta\theta\right)\end{aligned} \quad (16)$$

Figure 4:
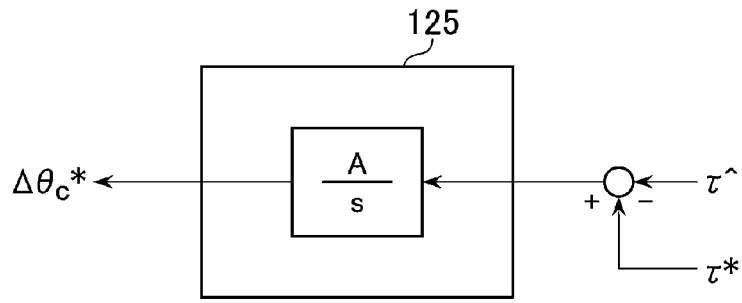
FIG. 4 is an explanatory diagram of the operation of a phase error command calculator used in the motor control device according to the first embodiment of the present invention.

Furthermore, in the "phase error command calculator 125" shown in FIG. 4, the deviation between the torque command τ* and the output torque estimate τ^ is multiplied by an integral gain A and an integral calculation is performed (or proportional+integral calculation may be performed) to create the command value Δθc* of the phase error in such a manner that the output torque estimate τ^ follows the torque command τ*.

The speed estimation calculator 130 calculates the speed estimate ω^ in such a manner that the estimate Δθc of the phase error corresponds to this command value Δθc*.

By forming such a feedback loop, even if the motor constant involves an error, this error can be compensated and torque control with high accuracy can be realized.

A variation in the output torque in the present embodiment will be described by using FIG. 5.

FIG. 5 is an explanatory diagram of a variation in the output torque in the motor drive system using the motor control device according to the first embodiment of the present invention.

The torque control characteristics when the present invention is used will be described.

In the control device in FIG. 1, Lq* set in the "voltage vector calculator 160" and the "phase error estimation calculator 115" is set with a relationship of Lq*>Lq (the same condition as FIG. 2).

Figure 5A:
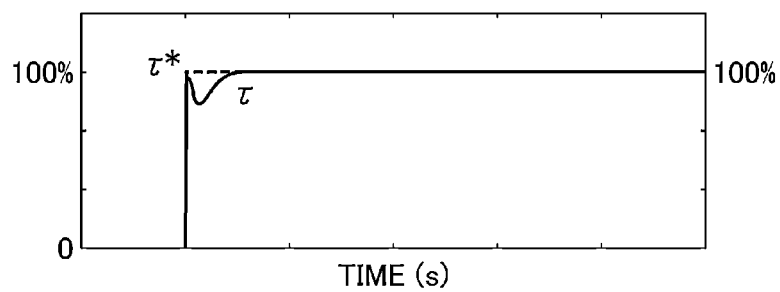
FIG. 5A is a diagram showing the output torque when the torque command is step changed to 100% in the motor drive system using the motor control device according to the first embodiment of the present invention.
Figure 5B:
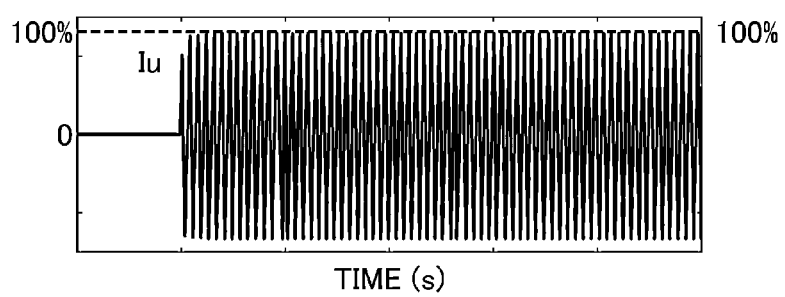
FIG. 5B is a diagram showing the motor current in the motor drive system using the motor control device according to the first embodiment of the present invention.
Figure 5C:
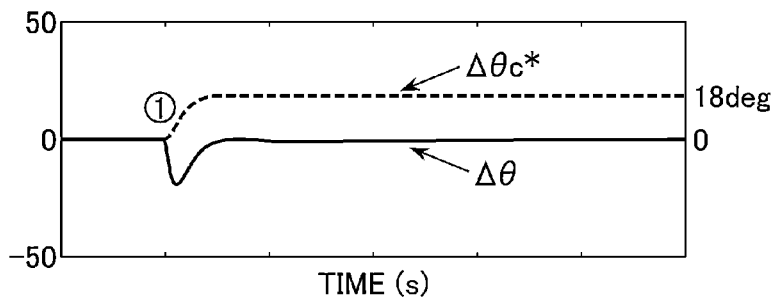
FIG. 5C is a diagram showing a relationship of the phase error in the motor drive system using the motor control device according to the first embodiment of the present invention.

FIG. 5(A) shows the output torque τ when the torque command τ* is step changed to 100%. FIG. 5(B) shows the motor current Iu, and FIG. 5(C) shows the relationship of the phase error Δθ.

Similarly to the case of FIG. 2, the torque command τ* is given as 100% as shown by a dashed line in FIG. 5(A). From a point of time t1, the command value Δθcτ of the phase error shown by a dashed line in FIG. 5(C) is generated as e.g. +20 (deg) constantly and the phase of the control axis is advanced. Due to this, the actual phase error Δθ becomes "zero." Thus, as shown in FIG. 5(A), the output torque 100% equal to the torque command τ* can be achieved.

Next, another configuration of the torque estimation calculator used in the motor control device according to the present embodiment will be described by using FIG. 6.

Figure 6:
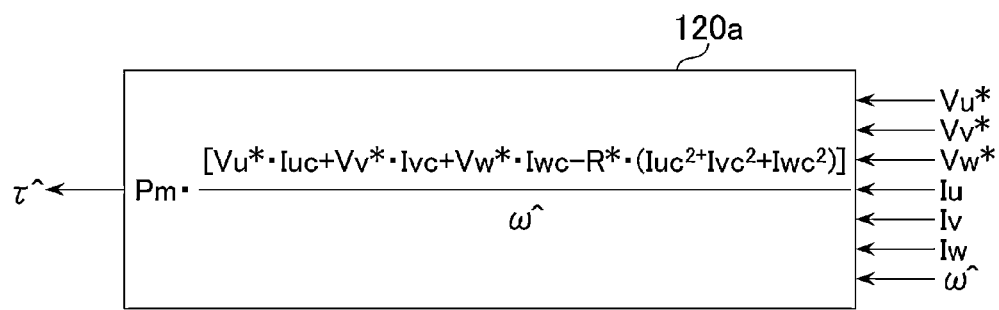
FIG. 6 is an explanatory diagram of another configuration of the torque estimation calculator used in the motor control device according to the first embodiment of the present invention.

FIG. 6 is an explanatory diagram of another configuration of the torque estimation calculator used in the motor control device according to the first embodiment of the present invention.

In the configuration shown in FIG. 3, the torque estimation calculator 120 performs an estimation calculation by using the d-axis and q-axis voltage command values and current detection values. Instead, the configuration shown in FIG. 6 may be employed. Specifically, a torque estimation calculator 120a performs an estimation calculation of the output torque τ by using the three-phase voltage command values (Vu*, Vv*, Vw*) and the three-phase current detection values (Iuc, Ivc, Iwc).

More specifically, the torque estimation calculator 120a performs the calculation of the following formula (17).

[Expression 17]

$$\tau\hat{} = Pm \cdot \left[ \frac{Vu^* \cdot Iuc + Vv^* \cdot Ivc + Vw^* \cdot Iwc - R^* \cdot (Iuc^2 + Ivc^2 + Iwc^2)}{\omega\hat{}} \right] \quad (17)$$

Thereby, it can estimate the output torque τ of formula (4) with high accuracy equally to formula (16).

As described above, according to the present embodiment, even if an error occurs in the q-axis inductance set for an estimation calculation of the phase error (phase difference between the reference axis of control and the magnetic flux axis of the motor) of the position-sensorless control system in the control device of a permanent magnet synchronous motor using no position sensor, the output torque equal to the torque command value can be realized by calculating the command value of the phase error in such a manner that the torque estimate calculated from the active power value corresponds to the torque command value. By compensating an error including a setting error in the motor constant in this manner, torque control with high accuracy is possible.

Next, the configuration and operation of a motor control device according to a second embodiment of the present invention will be described by using FIGS. 7 and 8.

Figure 7:
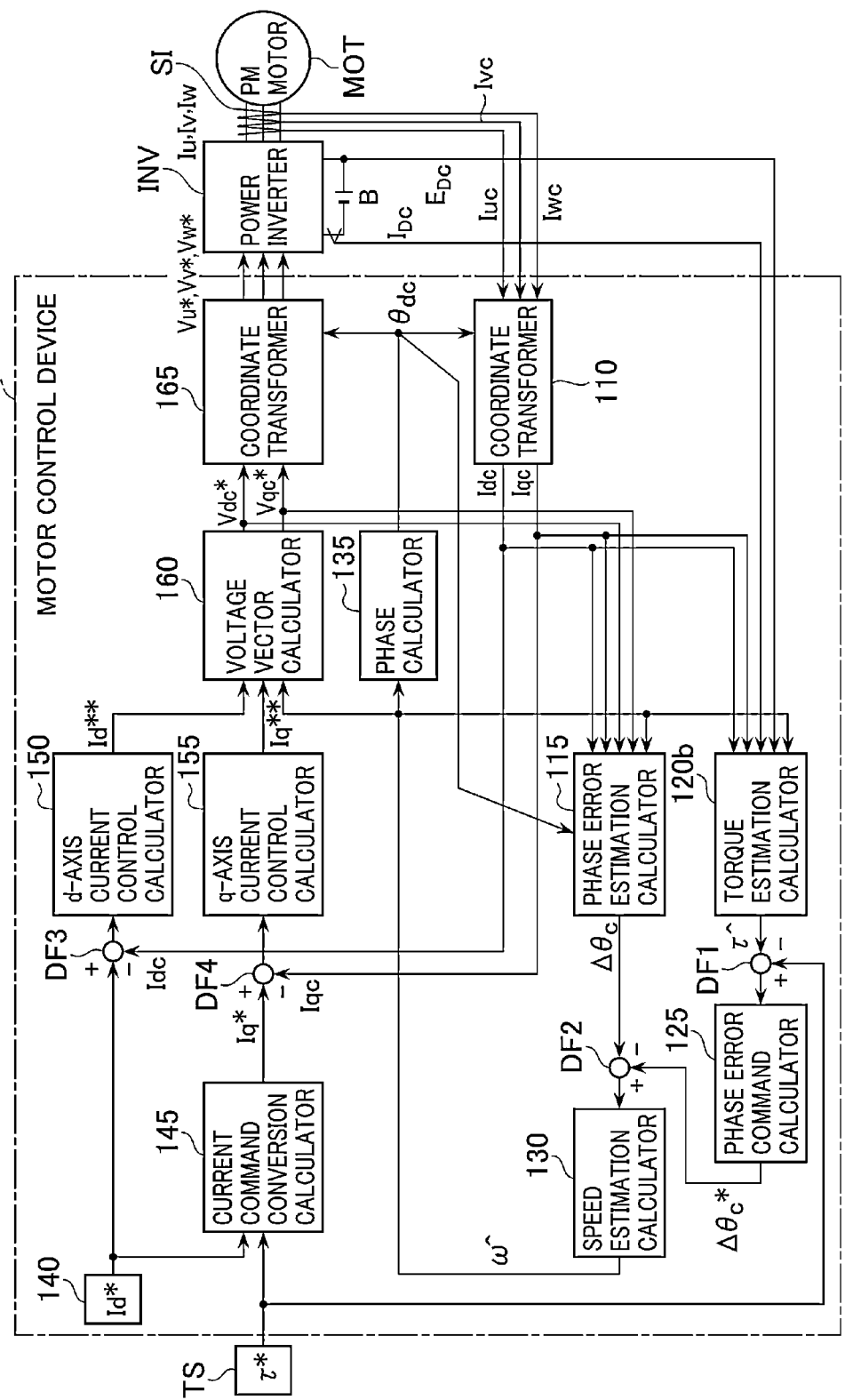
FIG. 7 explains the configuration of a motor drive system using a motor control device according to a second embodiment of the present invention.

FIG. 7 explains the configuration of a motor drive system using the motor control device according to the second embodiment of the present invention. FIG. 8 is an explanatory diagram of the operation of a torque estimation calculator used in the motor control device according to the second embodiment of the present invention.

A motor control device 100a of the present embodiment is different from the motor control device 100 shown in FIG. 1 in that it includes a torque estimation calculator 120b instead of the torque estimation calculator 120 in the motor control device 100 in FIG. 1.

A DC power supply B supplies a DC voltage to a power inverter INV and then outputs a DC voltage EDC and a DC current IDC to the torque estimation calculator 120b.

The torque estimation calculator 120b performs an estimation calculation of output torque τ̂ by using information on the power inverter (EDC, IDC), d-axis and q-axis current detection values (Idc, Iqc), and a speed estimate ω̂.

That is, in the present example, the torque estimation calculator 120b performs the estimation calculation of the output torque by using information on the DC voltage and DC current of the power inverter differently from the torque estimation calculator 120 shown in FIG. 1 that performs the estimation calculation of the output torque by using voltage and current information of the control system.

Figure 8:
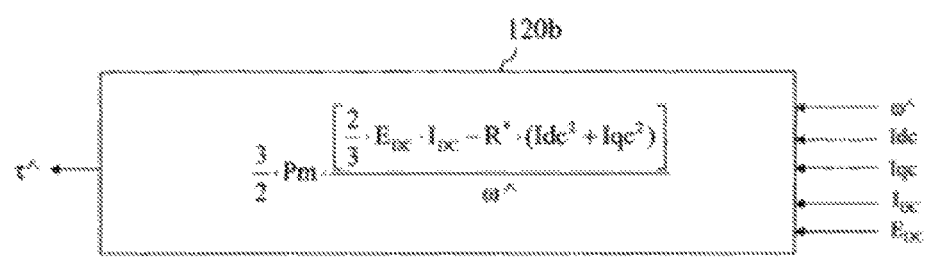
FIG. 8 is an explanatory diagram of the operation of a torque estimation calculator used in the motor control device according to the second embodiment of the present invention.

As shown in FIG. 8, the torque estimation calculator 120b performs a calculation of the following formula (18).

[Expression 18]

$$\tau\hat{} = \frac{3}{2} \cdot Pm \cdot \left[ \frac{\frac{2}{3} \cdot E_{DC} \cdot I_{DC} - R^*(Idc^2 + Iqc^2)}{\omega\hat{}} \right] \quad (18)$$

Thereby, it can estimate the output torque τ of formula (4) with high accuracy equally to formula (16).

Also by the present embodiment, torque control with high accuracy is possible through compensating an error including a setting error in the motor constant.

Next, the configuration and operation of a motor control device according to a third embodiment of the present invention will be described by using FIGS. 9 to 11.

Figure 9:
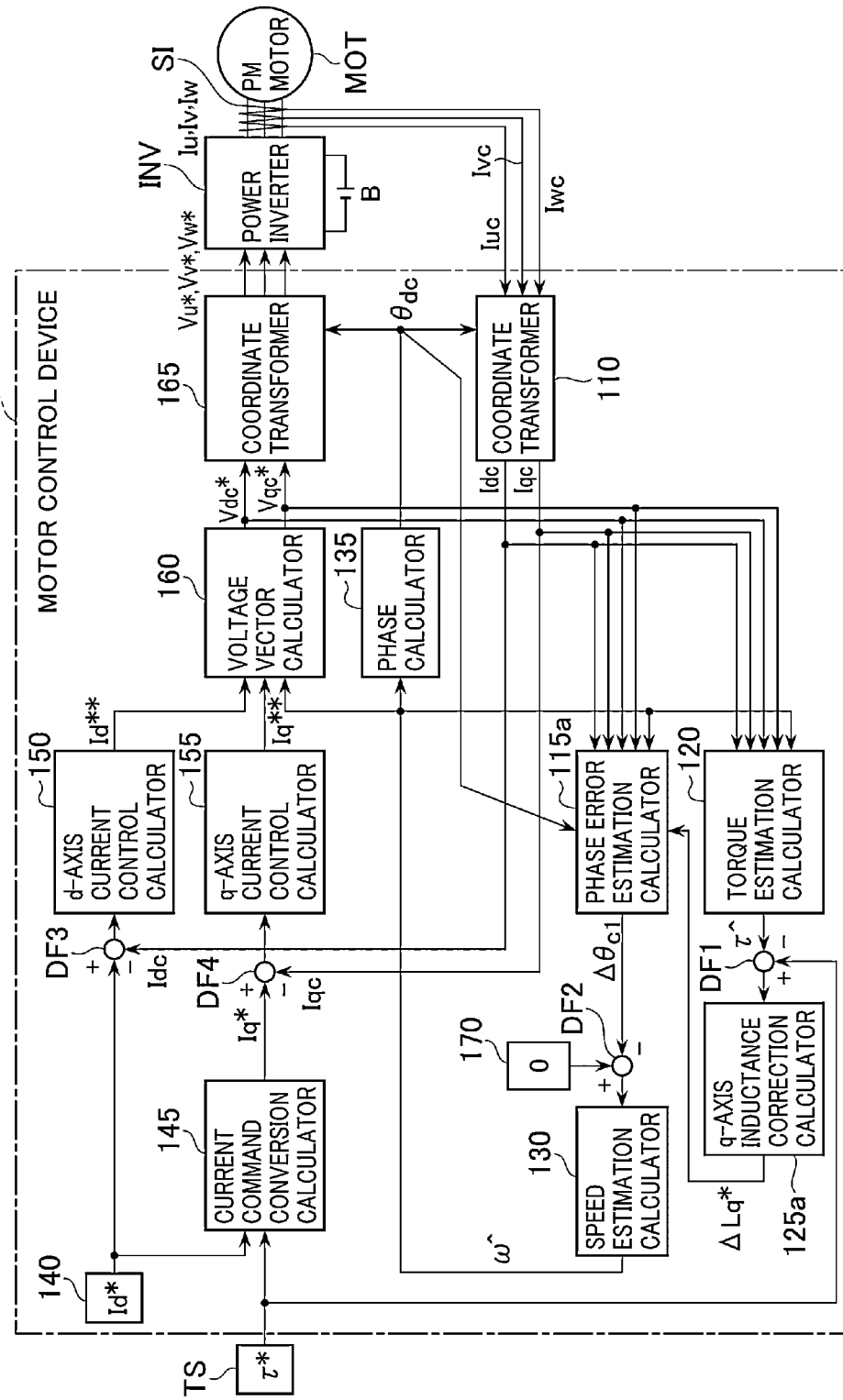
FIG. 9 explains the configuration of a motor drive system using a motor control device according to a third embodiment of the present invention.

FIG. 9 explains the configuration of a motor drive system using the motor control device according to the third embodiment of the present invention. FIG. 10 is an explanatory diagram of the operation of a q-axis inductance correction calculator used in the motor control device according to the third embodiment of the present invention. FIG. 11 is an explanatory diagram of the operation of a phase error estimation calculator used in the motor control device according to the third embodiment of the present invention.

A motor control device 100b of the present embodiment is different from the motor control device 100 shown in FIG. 1 in that it includes a phase error estimation calculator 115a and a q-axis inductance correction calculator 125a instead of the phase error estimation calculator 115 and the phase error command calculator 125 in the motor control device 100 in FIG. 1. It further includes a phase error command value setter 170.

Specifically, in the examples shown in FIGS. 1 and 7, the command value Δθc* of the phase error is created in such a manner that the output torque estimate τ̂ follows the torque command τ*.

In contrast, in the present example, a q-axis inductance correction value ΔLq* is created instead of the command value Δθc* of the phase error. An estimation calculation of an estimate Δθc1 of the phase error is performed by the value obtained by addition of the setting value Lq* of the motor constant about the q-axis inductance and the q-axis inductance correction value ΔLq*.

The phase error estimation calculator 115a outputs the phase error estimate Δθc1 by estimation calculation of a phase error Δθ as the deviation between an estimate θdc of the rotational phase and a rotational phase value θd of a permanent magnet synchronous motor MOT based on voltage command values (Vdc*, Vqc*) output by a voltage vector calculator 160, a speed estimate ω^ estimated by a speed estimation calculator 130, current detection values (Idc, Iqc) output by a coordinate transformer 110, preset electric constants (R, Ld, Lq, Ke) of the permanent magnet synchronous motor MOT, and the correction value ΔLq* of the q-axis inductance.

The q-axis inductance correction calculator 125a performs a proportional-integral calculation of the deviation (τ*−τ^) output by a difference calculator DF1 and then outputs an output value thereof as the correction value ΔLq* of the q-axis inductance.

Figure 10:
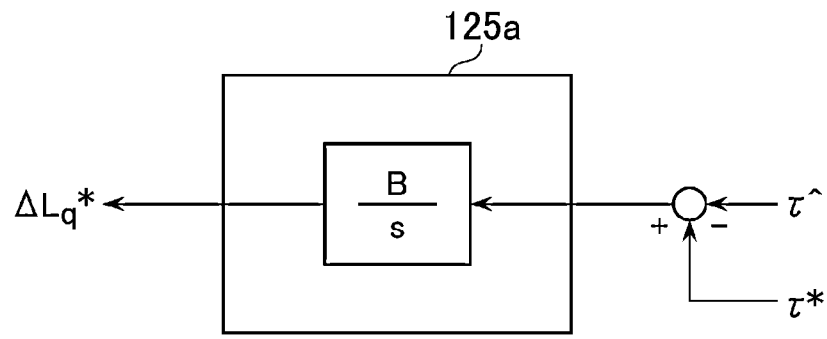
FIG. 10 is an explanatory diagram of the operation of a q-axis inductance correction calculator used in the motor control device according to the third embodiment of the present invention.

As shown in FIG. 10, the q-axis inductance correction calculator 125a multiplies the deviation between the torque command value τ* and the output torque estimate τ^ by an integral gain B and then performs an integral calculation to create the correction value ΔLq* of the q-axis inductance in such a manner that the output torque estimate τ^ follows the torque command value τ*. Instead of the integral calculation, proportional+integral calculation may be employed.

Figure 11:
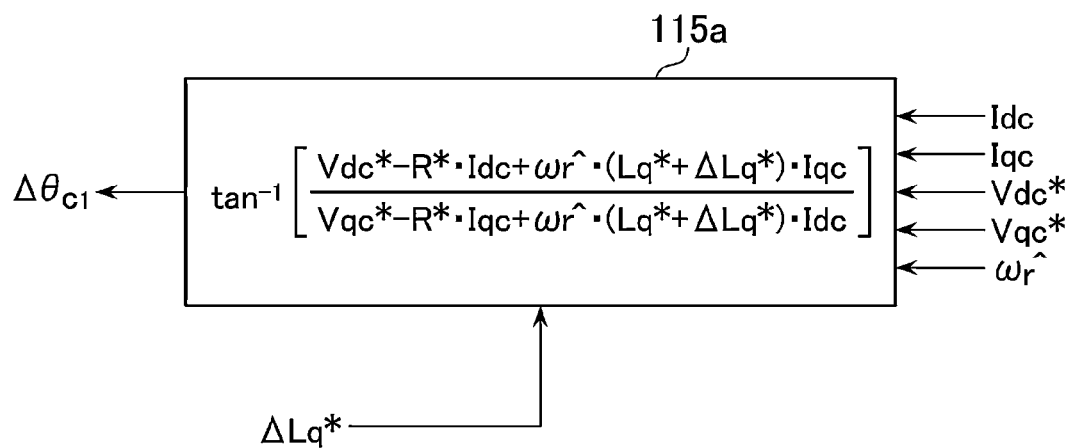
FIG. 11 is an explanatory diagram of the operation of a phase error estimation calculator used in the motor control device according to the third embodiment of the present invention.

As shown in FIG. 11, the phase error estimation calculator 115a calculates the estimate Δθc1 of the phase error in accordance with formula (19) based on the voltage command values (Vdc*, Vqc*) output by the voltage vector calculator 160, the speed estimate ω^ estimated by the speed estimation calculator 130, the current detection values (Idc, Iqc) output by the coordinate transformer 110, the preset electric constants (R, Ld, Lq, Ke) of the permanent magnet synchronous motor MOT, and the correction value ΔLq* of the q-axis inductance.

[Expression 19]

$$\Delta\theta c1 = \tan^{-1}\left[\frac{Vdc^* - R^* \cdot Idc + \omega r^\wedge \cdot (Lq^* + \Delta Lq^*) \cdot Idc}{Vqc^* - R^* \cdot Iqc + \omega r^\wedge \cdot (Lq^* + \Delta Lq^*) \cdot Idc}\right] \quad (19)$$

A difference calculator DF2 calculates and outputs the difference (Δθc*−Δθ) between the phase error Δθ output by the phase error estimation calculator 115a and the command value Δθc* of the phase error output by the phase error command value setter 170. The command value Δθc* of the phase error output by the phase error command value setter 170 is "zero" here. Therefore, the difference calculator DF2 outputs the phase error Δθ output by the phase error estimation calculator 115a as it is.

In the present example also, the torque control characteristic equivalent to that when the phase error command calculator 125 in FIG. 1 is provided can be realized by correcting the q-axis inductance.

In the present embodiment, the estimation calculation is performed in the torque estimation calculator 120 by using the d-axis and q-axis voltage command values and current detection values. Yet the torque estimation calculator 120a shown in FIG. 6 or the torque estimation calculator 120b shown in FIG. 8 may be used as well.

With the present embodiment also, an error including a setting error in a motor constant is compensated, thereby enabling torque control with high accuracy.

Modification examples for the first to third embodiments shown in FIGS. 1 to 11 will be described below. In the first to third embodiments, the second current command values (Id, Iq) are created from the first current command values (Id*, Iq*) and the current detection values (Idc, Iqc), and then a vector control calculation is performed by using these current command values.

In contrast, for example, voltage correction values (ΔVd*, ΔVq*) may be created from the first current command values (Id*, Iq*) and the current detection values (Idc, Iqc). Then, a calculation in accordance with the following formula (20) may be performed with use of these voltage correction values (ΔVd*, ΔVq*), the first current command values (Id*, Iq*), the speed estimate ω^, and the electric constants of the motor MOT.

[Expression 20]

$$\begin{bmatrix} Vdc^* \\ Vqc^* \end{bmatrix} = \begin{bmatrix} R^* & -\omega^\wedge \cdot Lq^* \\ \omega^\wedge \cdot Ld^* & R^* \end{bmatrix} \cdot \begin{bmatrix} Id^* \\ Iq^* \end{bmatrix} + \begin{bmatrix} 0 \\ \omega^\wedge \cdot Ke^* \end{bmatrix} + \begin{bmatrix} \Delta Vd^* \\ \Delta Vq^* \end{bmatrix} \quad (20)$$

The voltage command values (Vdc*, Vqc*) are thereby calculated.

In contrast to the first to third embodiments, calculation in accordance with the following formula (21) may be performed with use of the first d-axis current command Id* (=0), a primary delay signal Iqctd of the q-axis current detection value Iqc, the speed estimate ω^, and the electric constants of the motor MOT.

[Expression 21]

$$\begin{bmatrix} Vdc^* \\ Vqc^* \end{bmatrix} = \begin{bmatrix} R^* & -\omega^\wedge \cdot Lq^* \\ \omega^\wedge \cdot Ld^* & R^* \end{bmatrix} \cdot \begin{bmatrix} Id^* \\ Iqctd \end{bmatrix} + \begin{bmatrix} 0 \\ \omega^\wedge \cdot Ke^* \end{bmatrix} \quad (21)$$

The voltage command values (Vdc*, Vqc*) are thereby calculated.

The first to third embodiments employ a system that detects the three-phase AC currents Iu, Iv, and Iw detected by the expensive current detector SI. Yet it is also possible to reproduce three-phase motor currents Iu^, Iv^, and Iw^ from the DC current IDC flowing through a single-shunt resistor attached for detection of overcurrent of the power inverter INV and use these reproduced current values.

Next, the configurations of work vehicles to which the motor control devices according to the respective embodiments of the present invention are applied will be described by using FIGS. 12 and 13.

Figure 12:
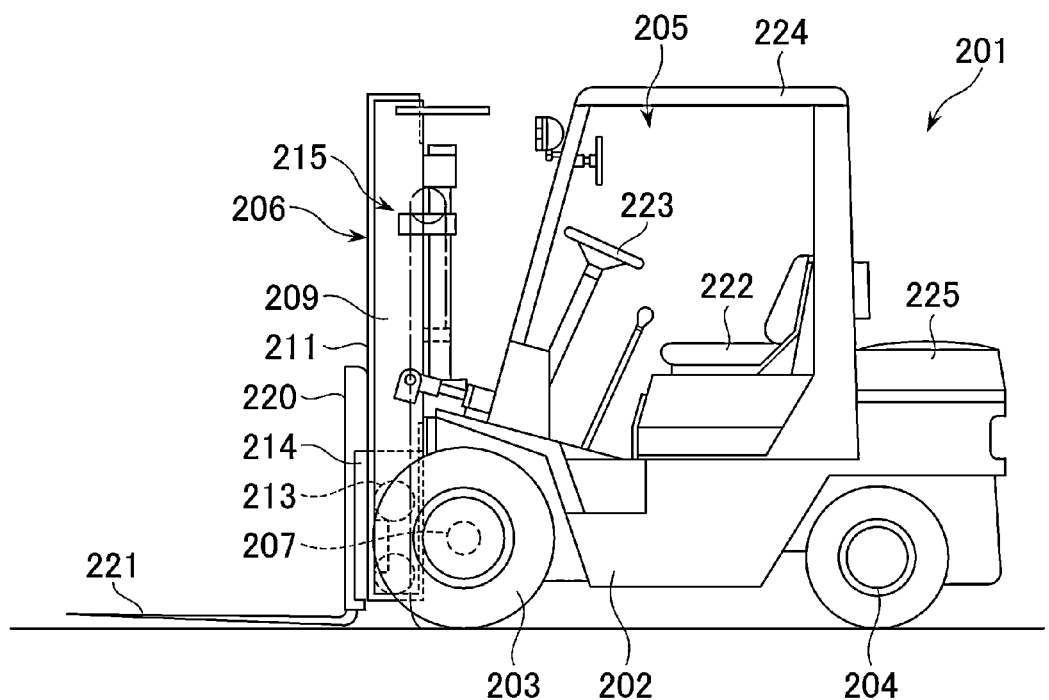
FIG. 12 is a configuration diagram of a work vehicle to which the motor control devices according to the respective embodiments of the present invention are applied.
Figure 13:
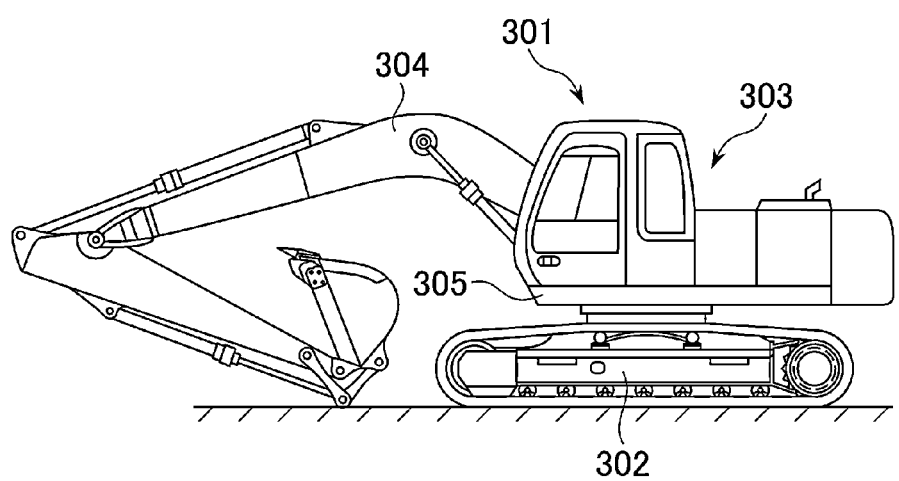
FIG. 13 is a configuration diagram of a work vehicle to which the motor control devices according to the respective embodiments of the present invention are applied.

FIGS. 12 and 13 are configuration diagrams of the work vehicles to which the motor control devices according to the respective embodiments of the present invention are applied.

FIG. 12 shows the configuration of a forklift 201 as an example of work vehicles.

In the forklift 201, a pair of left and right front wheels (drive wheels) 203 are provided at the front part of its vehicle body 202 and a pair of left and right rear wheels (turn wheels) 204 are provided at the rear part. A cab 205 is made at the front part of the vehicle body 202 and on the upper side. A vertically-extendable mast 206 is attached to the front end part of the vehicle body 202 in such a manner as to be capable of tilting in the front-rear direction via a mast connecting shaft 207 along the vehicle width direction. In addition, a tilt cylinder 208 to allow the front-rear tilting is provided between the vehicle body 202 and the mast 206.

The mast 206 is composed of a pair of left and right outer frames 209 on the side of the vehicle body 202 and a pair of left and right inner frames 211 that are guided by these outer frames 209 via an inner frame roller and are capable of ascending/descending. A lift cylinder 212 is provided between the outer frames 209 and the inner frames 211. Further, a lift bracket 214 that is guided via a bracket roller 213 and is capable of ascending/descending is provided on the inner frame side. A lift interlock means 215 is provided between the mast 206 and the lift bracket 214. On the lift bracket 214, a pair of left and right forks 221 is provided with the intermediary of a holding frame body 220. A seat 222, a steering wheel 223 located in front of this seat 222, and so forth are disposed in the cab 205. Furthermore, a head guard 224 is disposed above. Moreover, a counterweight 225 is provided rearward of the seat 222 and on the vehicle body 202.

The permanent magnet synchronous motor MOT controlled by the motor control device 100 shown in FIG. 1 is a motor for traveling driving that drives the wheels (drive wheels) 203.

FIG. 13 shows the configuration of a hydraulic excavator 301 as another example of work vehicles.

The hydraulic excavator 301 of a crawler type as a construction machine is roughly composed of an undercarriage 302 capable of being self-propelled, an upper revolving body 303 that is revolvably mounted on this undercarriage 302 and forms the vehicle body with this undercarriage 302, and work equipment 304 that is provided on the front side of this upper revolving body 303 in such a manner as to be capable of looking up/down and carries out works including soil excavation works. A revolving frame 305 of the upper revolving body 303 is formed as a vehicle body frame composed of a support structure body.

The permanent magnet synchronous motor MOT controlled by the motor control device 100 shown in FIG. 1 is a revolving motor for revolving the upper revolving body 303 relative to the undercarriage 302.

Moreover, the configuration and operation of a motor control device according to a fourth embodiment of the present invention will be described below by using FIGS. 14 to 23.

First, the configuration of a motor drive system using the motor control device according to the present embodiment will be described by using FIG. 14.

FIG. 14 explains the configuration of the motor drive system using the motor control device according to the fourth embodiment of the present invention.

The motor drive system according to the present embodiment is composed of a motor control device 100, a power inverter INV, a permanent magnet synchronous motor (PM motor; AC motor) MOT, a position detector PD, and a torque command setter TS.

The permanent magnet synchronous motor (PM motor; AC motor) MOT is composed of a rotor and a stator. The rotor includes a permanent magnet and a field winding, and the stator includes an armature winding. The permanent magnet synchronous motor MOT outputs torque obtained by combining a torque component by magnetic flux of the permanent magnet and a torque component by inductance of the armature winding. The permanent magnet synchronous motor MOT is a motor used for a work machine as described later by using FIG. 28. The motor control device 100 of the present embodiment is used for controlling such a motor MOT.

The power inverter INV converts a DC voltage supplied from a DC power supply B to three-phase AC voltages based on three-phase AC voltage command values (Vu*, Vv*, Vw*) and supplies them to the permanent magnet synchronous motor MOT to vary the output torque of the permanent magnet synchronous motor MOT.

A current detector SI detects three-phase AC currents (Iu, Iv, Iw) of the permanent magnet synchronous motor MOT.

The position detector PD is a resolver or an encoder capable of detecting the position θ of the motor and outputs a position detection value θdc.

The torque command setter TS outputs to the motor control device 100 a torque command value τ* as a command value of the torque output by the permanent magnet synchronous motor MOT. The torque command value τ* is a value of "positive or negative polarity" including "zero." The torque command setter TS is included inside an upper-level control device for the motor control device 100.

The motor control device 100 includes a coordinate transformer 110, a speed calculator 415, a torque estimation calculator 120, a torque correction calculator 425, a d-axis current command setter 140, a current command conversion calculator 145, a d-axis current control calculator 150, a q-axis current control calculator 155, a voltage vector calculator 160, a coordinate transformer 165, and difference calculators (DF1, DF2, DF3, DF4).

The coordinate transformer 110 outputs d-axis and q-axis current detection values (Idc, Iqc) from current detection values (Iuc, Ivc, Iwc) as detection values by the current detector SI regarding the three-phase AC currents (Iu, Iv, Iw) supplied to the permanent magnet synchronous motor MOT and an estimate θdc of the rotational phase estimated by the phase calculator 135.

The position detection value θdc detected by the position detector PD is input to the speed calculator 415 that outputs a speed detection value ω of the PM motor MOT.

The torque estimation calculator 120 performs estimation calculation of the output torque by using voltage command values (Vdc*, Vqc*) output by the voltage vector calculator 160, a speed estimate ω^ estimated by a speed estimation calculator 130, and the current detection values (Idc, Iqc) output by the coordinate transformer 110, and then outputs a torque estimate τ^.

The difference calculator DF1 calculates the deviation (τ*−τ^) between the torque command value τ* output by the torque command setter TS and the torque estimate τ^ calculated by the torque estimation calculator 120.

The torque correction calculator 425 performs a proportional/integral calculation of the deviation (τ*−τ^) as the output of the difference calculator DF1 and outputs a correction value Δτ* of the torque command.

An adder AD1 adds the torque command value τ* output by the torque command setter TS and the correction value Δτ* of the torque command output by the torque correction calculator 425.

The d-axis current command setter 140 outputs a d-axis current command value Id* as a value of "zero" or "negative polarity".

The current command conversion calculator 145 calculates a q-axis current command value Iq* by using the torque command value τ* from the torque command setter TS, the d-axis current command value Id* output by the d-axis current command setter 140, and electric constants (Ld, Lq, Ke) of the permanent magnet synchronous motor MOT. The electric constants (Ld, Lq, Ke) are held inside the current command conversion calculator 145 as setting values. As the values of the electric constants (Ld, Lq, Ke), design values of the permanent magnet synchronous motor MOT for which driving control is carried out by the motor control device 100 of the present embodiment are set and held.

The difference calculator DF2 calculates the deviation (Id*−Idc) between the first d-axis current command value Id* output by the d-axis current command setter 140 and the current detection value Idc output by the coordinate transformer 110.

The d-axis current control calculator 150 outputs a second d-axis current command value Id** from the deviation (Id*−Idc) calculated by the difference calculator DF2.

The difference calculator DF3 calculates the deviation (Iq*−Iqc) between the first q-axis current command value Iq* output by the current command conversion calculator 145 and the current detection value Iqc output by the coordinate transformer 110.

The q-axis current control calculator 155 outputs a second q-axis current command value Iq** from the deviation (Iq*−Iqc) calculated by the difference calculator DF3.

The voltage vector calculator 160 outputs the d-axis and q-axis voltage command values (Vdc*, Vqc*) based on the second d-axis current command value Id output by the d-axis current control calculator 150, the second q-axis current command value Iq output by the q-axis current control calculator 155, the speed estimate ω^, and the preset electric constants (R, Ld, Lq, Ke) of the permanent magnet synchronous motor MOT.

The coordinate transformer 165 outputs the three-phase AC voltage command values (Vu*, Vv*, Vw*) from the voltage command values (Vdc*, Vqc*) output by the voltage vector calculator 160 and the estimate θdc of the rotational phase estimated by the phase calculator 135.

That is, in the present embodiment, the current supplied to the motor is so controlled that the q-axis current command value Iq* obtained from the torque command value τ* to the motor and the preset d-axis current command value Id* correspond to the d-axis and q-axis current detection values (Idc, Iqc) regarding the currents (Iu, Iv, Iw) supplied to the motor via the power inverter. By the above feedback control, the current supplied to the motor is so controlled that the torque of the motor corresponds to the torque command value. However, if the motor constant involves an error, the torque value that is actually output from the motor will differ from the torque command value.

Next, the operation of the motor control device 100 of the present embodiment will be described. First, an explanation will be made about the basic operation of a control system when the "torque estimation calculator 120" and the "torque correction calculator 425," which are features of the present embodiment, are not used.

In the current command conversion calculator 145, the q-axis current command Iq* matching the torque command τ* is calculated based on formula (22) by using the torque command τ*, the d-axis current command Id*, and the electric constants of the PM motor MOT.

[Expression 22]

$$I_q^* = \frac{\tau^{**}}{\frac{3}{2} \cdot P_m \cdot (Ke^* + (Ld^* - Lq^*) \cdot Id^*)} \quad (22)$$

The d-axis current command value Id* and the current detection value Idc are input to the d-axis current control calculator 150, and the d-axis current command value Iq* and the current detection value Iqc are input to the q-axis current control calculator 155.

In accordance with formula (23), the d-axis current control calculator 150 and the q-axis current control calculator 155 perform a proportional/integral calculation to output the second d-axis and q-axis current command values (Id, q) in such a manner that the current detection values (Idc, Iqc) of the respective components follows the current command values Id* and q*.

[Expression 23]

$$\begin{bmatrix} Id^{**} = (Id^* - Idc) \cdot \left(Kpd + \frac{Kid}{s}\right) \\ Iq^{**} = (Iq^* - Iqc) \cdot \left(Kpq + \frac{Kiq}{s}\right) \end{bmatrix} \quad (23)$$

The parameters in this formula are as follows: Kpd: proportional gain of d-axis current control, Kid: integral gain of d-axis current control, Kpq: proportional gain of q-axis current control, and Kiq: integral gain of q-axis current control.

Moreover, in the voltage vector calculator 160, the voltage command values (Vdc, Vqc) shown in formula (24) are calculated by using the obtained second current command values (Id, Iq), the motor constants (R, Ld, Lq, Ke), and the speed detection value ω to control the output of the three-phase PWM inverter.

[Expression 243]

$$\begin{bmatrix} Vdc^{**} = R^* \cdot Id^{**} - \omega \cdot Ld^* \cdot Iq^{***} \\ Vqc^* = R^* \cdot Iq^{**} - \omega \cdot Ld^* \cdot Id^{***} + \omega \cdot Ke^* \\ Id^{***} = \frac{1}{1 + Ld^*/R^* \cdot s} \cdot Id^{} \\ Iq^{*} = \frac{1}{1 + Lq^*/R^* \cdot s} \cdot Iq^{**} \end{bmatrix} \quad (24)$$

The motor constants (R, Ld, Lq, Ke) are held inside the voltage vector calculator 160 as setting values. As the values of the motor constants (R, Ld, Lq, Ke), design values of the permanent magnet synchronous motor MOT for which driving control is carried out by the motor control device 100 of the present embodiment are set and held. The values of the motor constants (R, Ld, Lq, Ke) of the individual permanent magnet synchronous motor MOT actually used are different from the design values of the motor constants (R, Ld, Lq, Ke) of the permanent magnet synchronous motor MOT. However, the error between both and the error from the setting value generated due to aging change in the motor constants (R, Ld, Lq, Ke) of the individual permanent magnet synchronous motor MOT are compensated by using the torque estimation calculator 120 and the phase error command calculator 125 to be described later.

Meanwhile, the position detector PD such as a resolver, encoder, and magnetic pole position detector detects the position θ of the motor to obtain the position detection value θdc.

The coordinate transformers 110 and 165 perform coordinate transformation shown in formula (25) and formula (26) by using this position detection value θdc.

[Expression 25]

$$\begin{bmatrix} Vu^* \\ Vv^* \\ Vw^* \end{bmatrix} = \begin{bmatrix} 1 & 0 \\ 1/2 & \sqrt{3}/2 \\ -1/2 & -\sqrt{3}/2 \end{bmatrix} \cdot \begin{bmatrix} \cos[\theta dc] & -\sin[\theta dc] \\ \sin[\theta dc] & \cos[\theta dc] \end{bmatrix} \cdot \begin{bmatrix} Vdc^* \\ Vqc^* \end{bmatrix} \quad (25)$$

-continued

[Expression 26]

$$\begin{bmatrix} Idc \\ Iqc \end{bmatrix} = \frac{2}{3} \cdot \begin{bmatrix} \cos[\theta dc] & \sin[\theta dc] \\ -\sin[\theta dc] & \cos[\theta dc] \end{bmatrix} \cdot \begin{bmatrix} 1 & -1/2 & -1/2 \\ 0 & \sqrt{3}/2 & -\sqrt{3}/2 \end{bmatrix} \cdot \begin{bmatrix} Iuc \\ Ivc \\ Iwc \end{bmatrix} \quad (26)$$

The above is the basic operation of the torque control when the torque estimation calculator 120 and the torque correction calculator 425 are not used.

Next, the control characteristic when the torque estimation calculator 120 and the torque correction calculator 425 are not provided will be described.

First, an explanation will be made by using FIGS. 15 to 18 about the influence of an error in the motor constant set in the "current command conversion calculator 145" and the "voltage vector calculator 160" on the torque control characteristic.

FIGS. 15 and 17 are explanatory diagrams of variation in the output torque when an error does not exist in the setting value of the motor constant. FIGS. 16 and 18 are explanatory diagrams of variation in the output torque when an error exists in the setting value of the motor constant.

(A) of each diagram shows the output torque τ when the torque command τ* is step changed to 100%, and (B) of each diagram shows the AC motor current Iu.

[1] In the Case of Setting of Id*=0

In the control device in FIG. 14, operation of step changing the torque command τ* to 100% is carried out with setting of the d-axis current command Id*=0.

Figure 15A:
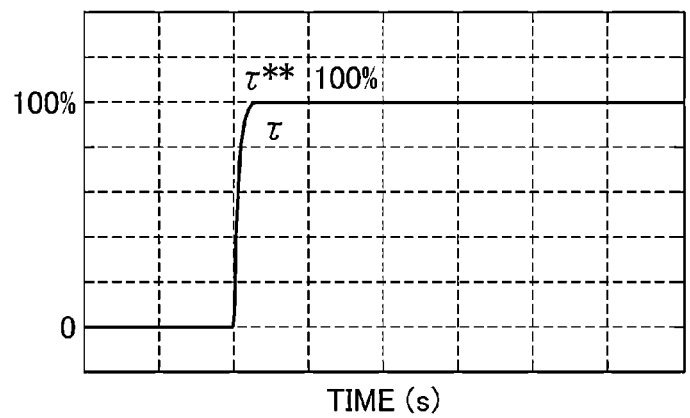
FIG. 15A is a diagram showing the output torque when the torque command is step changed to 100% in a case in which an error does not exist in setting values of motor constants.
Figure 15B:
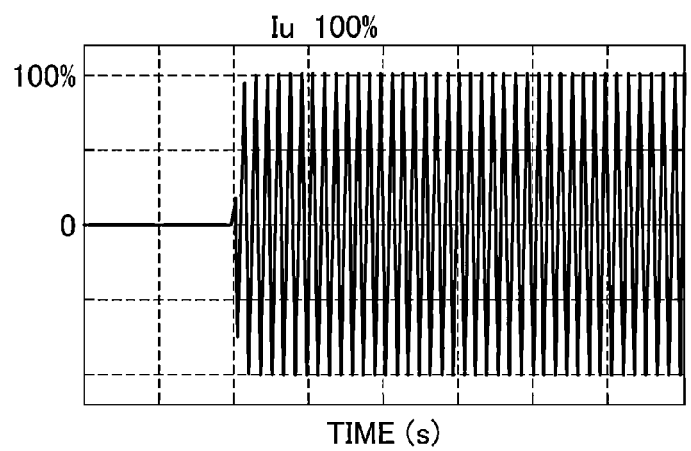
FIG. 15B is a diagram showing the AC motor current in the case in which an error does not exist in the setting values of the motor constants.

If an error does not exist in the setting value of the motor constant, as shown in FIG. 15 in the ideal state with no error, the u-phase AC current Iu of 100% is generated as shown in FIG. 15(B) and therefore the output torque τ of 100% equal to the torque command τ* can be obtained as shown in FIG. 15(A).

In the case in which an error exists in the setting value of the motor constant, here the error is given with a relationship of Lq*>Lq and Ke*>Ke.

Figure 16A:
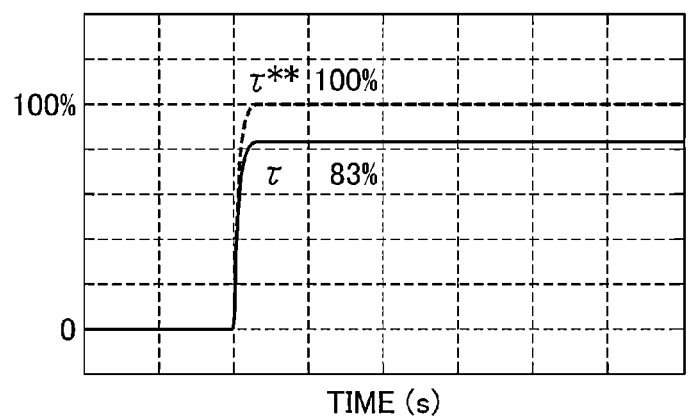
FIG. 16A is a diagram showing the output torque when the torque command is step changed to 100% in a case in which an error exists in the setting values of the motor constants.
Figure 16B:
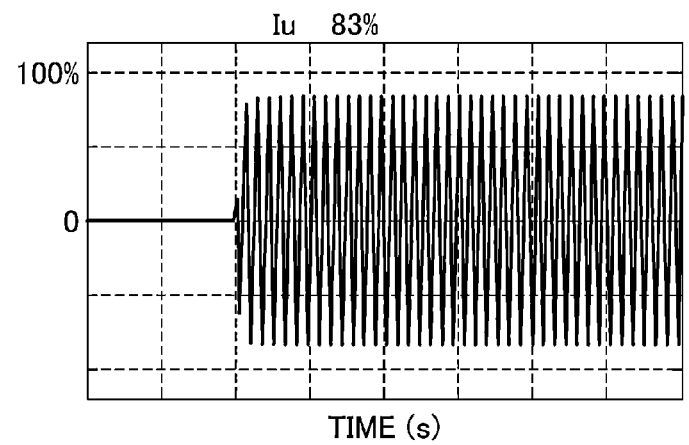
FIG. 16B is a diagram showing the AC motor current in the case in which an error exists in the setting values of the motor constants.

As shown in FIG. 16(A), the output torque τ is 83% although the torque command τ* is given as 100%. This is because the q-axis current command value Iq* has decreased in calculation of formula (27) in the "current command conversion calculator 145". As a result, the u-phase AC current Iu is 83% as shown in FIG. 16(B).

[Expression 27]

$$Iq^* = \frac{3}{2} \cdot P_m^{r*} \cdot Ke^* \quad (27)$$

This is because Ke* is included in the denominator component of formula (27), and thus the existence of a setting error in Ke* precludes application of the current that matches the torque.

[2] In the Case of Setting of Id*<0 for Maximum Torque Control

Next, in the control device in FIG. 14, operation of step changing the torque command τ* to 100% is carried out with setting of the d-axis current command Id*<0.

The output torque τ of the PM motor MOT is expressed by formula (28).

[Expression 28]

$$\tau = \frac{3}{2} \cdot Pm \cdot (Ke + (Ld - Lq) \cdot Id) \cdot Iq \quad (28)$$

If this formula (28) is developed, formula (29) is obtained.

[Expression 29]

$$\tau = \frac{3}{2} \cdot Pm \cdot Ke \cdot Iq + \frac{3}{2} \cdot Pm \cdot (Ld - Lq) \cdot Id \cdot Iq \quad (29)$$

The first term of the right side is a "magnet torque component," and the second term is a "reluctance torque component". By generating the d-axis current command Id* based on formula (30), the reluctance torque component can be used and the motor current can be minimized with the same torque.

[Expression 30]

$$Id^* = -\frac{Ke^*}{2 \cdot (Ld^* - Lq^*)} \sqrt{\frac{Ke^{*2}}{4 \cdot (Ld^* - Lq^*)^2} + Iq^{*2}} \quad (30)$$

Figure 17A:
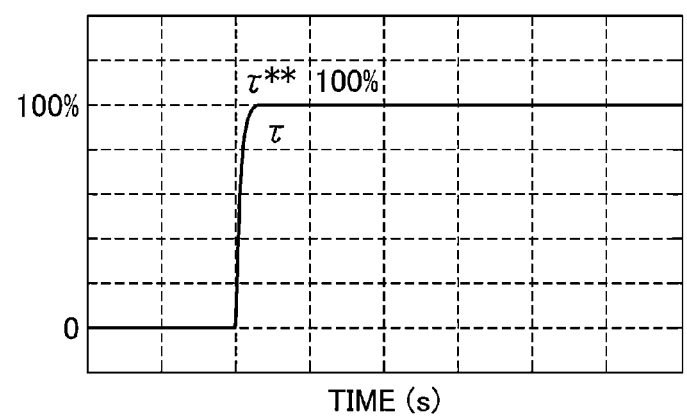
FIG. 17A is a diagram showing the output torque when the torque command is step changed to 100% in a case in which an error does not exist in the setting values of the motor constants.
Figure 17B:
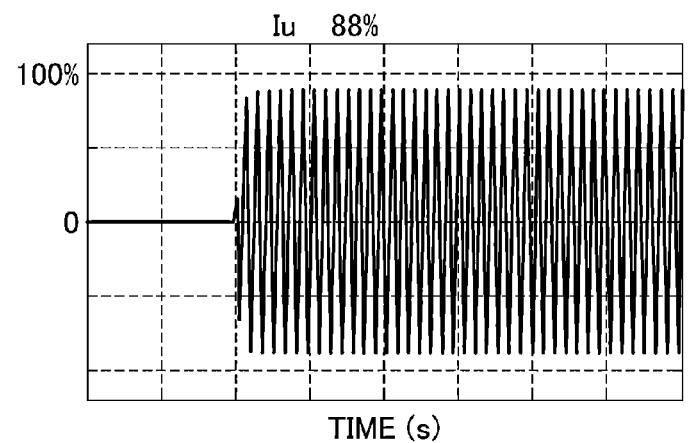
FIG. 17B is a diagram showing the AC motor current in the case in which an error does not exist in the setting values of the motor constants.

If an error does not exist in the setting value of the motor constant, in the ideal state with no error, the output torque τ of 100% equal to the torque command τ* can be obtained as shown in FIG. 17(A) and the u-phase AC current Iu is 88% as shown in FIG. 17(B). That is, the same torque can be output with a smaller current compared with FIG. 15.

Figure 18A:
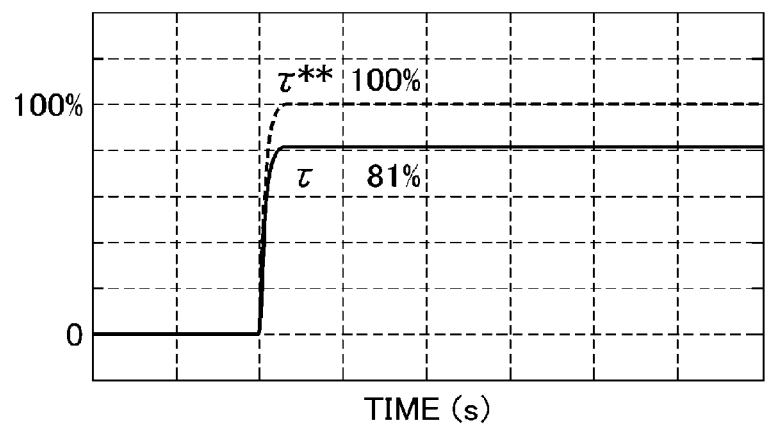
FIG. 18A is a diagram showing the output torque when the torque command is step changed to 100% in a case in which an error exists in the setting values of the motor constants.
Figure 18B:
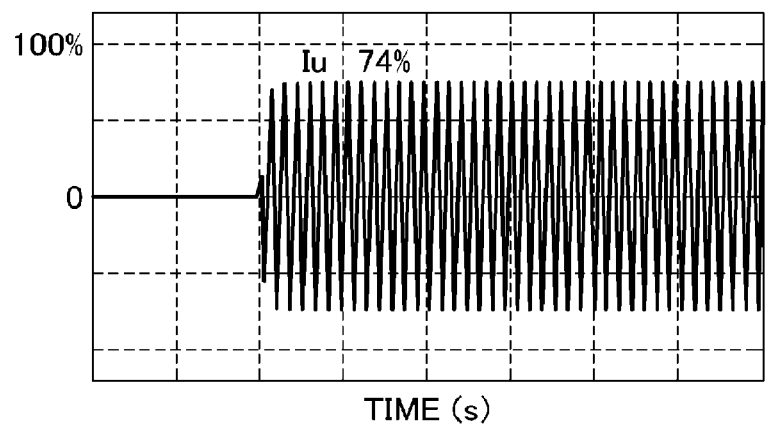
FIG. 18B is a diagram showing the AC motor current in the case in which an error exists in the setting values of the motor constants.

In the case in which an error exists in the setting value of the motor constant, the error is given with a relationship of Lq*>Lq and Ke*>Ke. In this case, as shown in FIG. 18(A), the output torque z is 81% although the torque command τ* is given as 100%. Therefore, the torque decreases by 2% compared with FIG. 16. As shown in FIG. 18(B), the u-phase AC current Iu also decreases to 74%.

This is because, in calculation of formula (22) and formula (30) in the "current command conversion calculator 145," Ke* and Lq* are included in the denominator component, and therefore the d-axis and q-axis current command values matching the torque command τ* cannot be generated due to the setting error thereof.

In the present invention, high-accuracy torque control by which the output torque τ equal to the torque command τ* is obtained is realized by introducing the "torque estimation calculator 120" and the "torque correction calculator 425."

Next, an explanation will be made by using FIGS. 19 and 20 about the operation principle when the "torque estimation calculator 120" and the "torque correction calculator 425" are used in the motor control device according to the fourth embodiment of the present invention.

Figure 19:
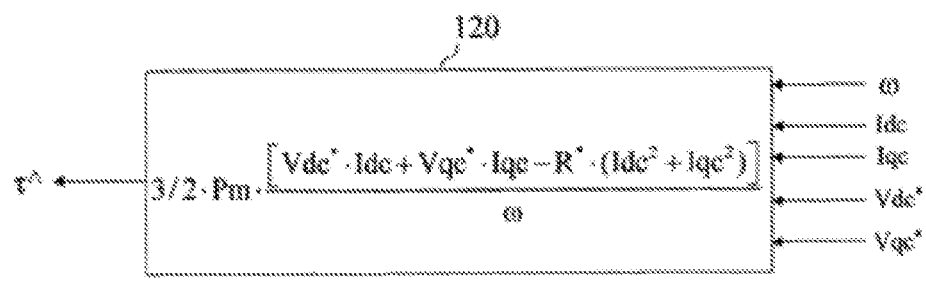
FIG. 19 is an explanatory diagram of the operation of a torque estimation calculator used in the motor control device according to the fourth embodiment of the present invention.

FIG. 19 is an explanatory diagram of the operation of the torque estimation calculator used in the motor control device according to the fourth embodiment of the present invention. FIG. 20 is an explanatory diagram of the operation of the torque correction calculator used in the motor control device according to the fourth embodiment of the present invention.

Active power P from the viewpoint of the magnetic flux axis of the motor is expressed by formula (31).

[Expression 31]

$$P = Vd \cdot Id + Vq \cdot Iq \quad (31)$$
$$= (R \cdot Id - \omega \cdot Lq \cdot Iq) \cdot Id + (R \cdot Iq + \omega \cdot Ld \cdot Id + \omega \cdot Ke) \cdot Iq$$
$$= R \cdot (Id^2 + Iq^2) + \omega \cdot (Ld - Lq) \cdot Id \cdot Iq + \omega \cdot Ke \cdot Iq$$

An estimate P^ calculated on the reference axis (dc–qc) of the control is expressed by formula (31).

[Expression 32]

$$P\char`\^ = Vdc^* \cdot Idc + Vqc^* \cdot Iqc \quad (32)$$
$$= (R^* \cdot Id^{**} - \omega \cdot Lq^* \cdot Iq^{***}) \cdot Idc +$$
$$(R^* \cdot Iq^{**} + \omega \cdot Ld^* \cdot Id^{***} + \omega \cdot Ke^*) \cdot Iqc$$
$$= R^* \cdot (Id^{} + Iq^{}) + \omega \cdot (Ld^* \cdot Id^{**} \cdot Iqc - Lq^* \cdot Iq^{**} \cdot Idc) +$$
$$\omega \cdot Ke^* \cdot Iqc$$

In the "torque estimation calculator 120" shown in FIG. 19, an estimation calculation of the output torque τ is performed by using this estimate P^ of the active power.

By utilizing that "the active power P observed from the magnetic flux axis of the motor" corresponds to "the estimate P^ calculated on the reference axis (dc–qc)," the torque estimation calculator 120 can estimate the output torque τ of formula (28) with high accuracy through the calculation of formula (33). In the formula (33) a copper loss component R×(Idc2+Iqc2) of the PM motor MOT is subtracted from formula (32), and the calculated value is divided by the speed detection value ω and then multiplied by a constant ((3/2)×Pm).

[Expression 33]

$$\tau\char`\^ = \frac{3}{2} \cdot Pm \cdot \frac{P\char`\^ - R^* \cdot (Idc^2 + Iqc^2)}{\omega} \quad (33)$$

Figure 20:
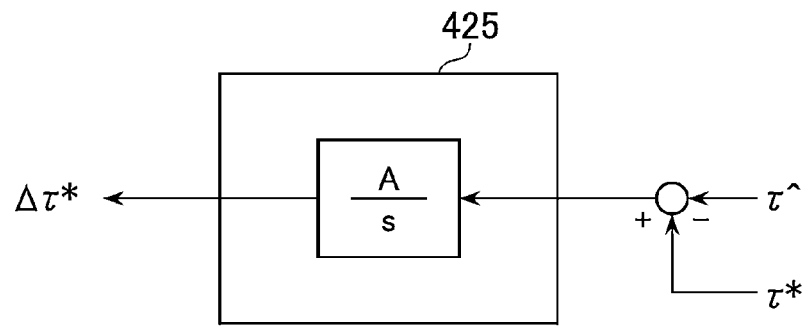
FIG. 20 is an explanatory diagram of the operation of a torque correction calculator used in the motor control device according to the fourth embodiment of the present invention.

In the "torque command corrector 425" shown in FIG. 20, the deviation between τ* and τ^ is multiplied by an integral gain A, and integral calculation is performed (or proportional+integral calculation may be performed) to create the correction value Δτ* of the torque command in such a manner that the output torque estimate τ^ follows the torque command τ*.

This correction value Δτ* is added to the first torque command value τ* given from the upper level to calculate a new second torque command value τ**, and calculation of the q-axis current command value Iq* is performed in the current command conversion calculator 145 based on formula (22).

By forming such a feedback loop, torque control with high accuracy can be realized.

A variation in the output torque in the present embodiment will be described by using FIGS. 21 and 22.

Figure 21:
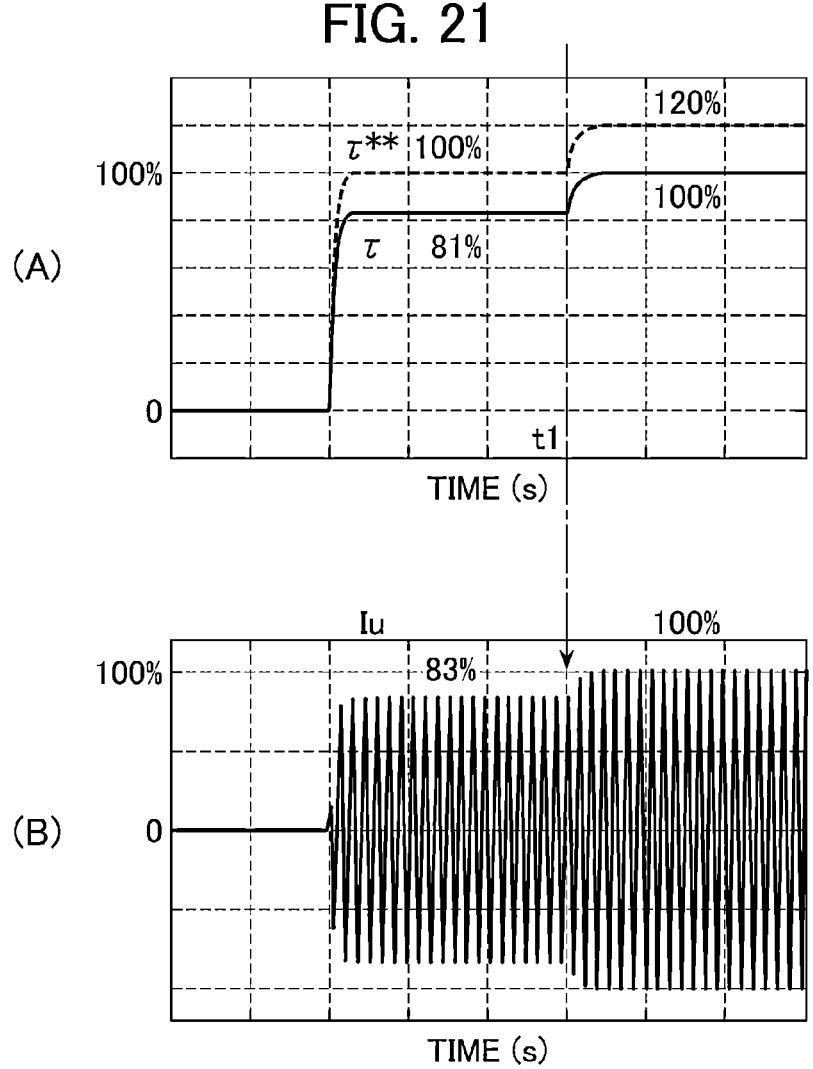
FIG. 21 is an explanatory diagram of variation in the output torque in the motor drive system using the motor control device according to the fourth embodiment of the present invention.
Figure 22:
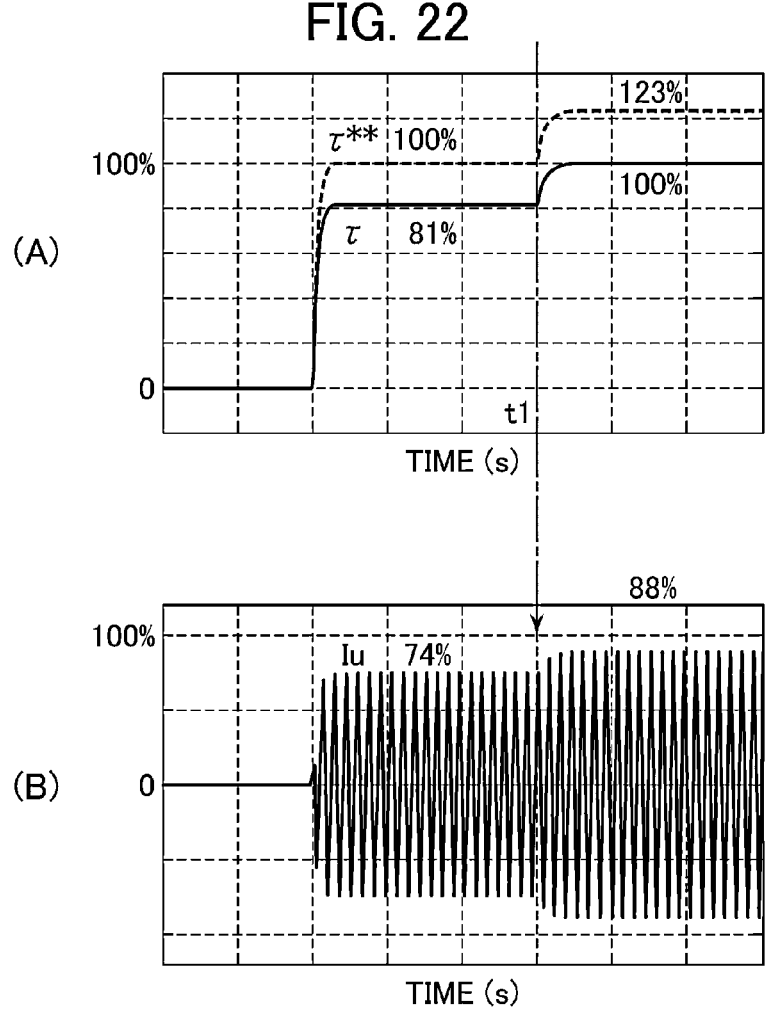
FIG. 22 is an explanatory diagram of variation in the output torque in the motor drive system using the motor control device according to the fourth embodiment of the present invention.

FIGS. 21 and 22 are explanatory diagrams of the variation in the output torque in the motor drive system using the motor control device according to the fourth embodiment of the present invention.

(A) of each diagram shows the output torque τ when the torque command τ* is step changed to 100%, and (B) of each diagram shows the AC motor current Iu.

The torque control characteristic when the present invention is used will be described.

In the control device in FIG. 14, an error is given to the setting values (Lq*, Ke*) of the motor constants set in the "current command conversion calculator 145" and the "voltage vector calculator 160" with a relationship of Lq*>Lq and Ke*>Ke (the same condition as FIGS. 15 and 16).

[1] In the Case of Setting of Id*=0

In FIG. 21, the relationship between the output torque τ and the u-phase AC current Iu when the torque command τ* is step-changed to 100% is shown. At time t1, a control operation of torque command correction is performed. Similarly to the case of FIG. 15, τ* is given as 100% as shown in FIG. 21(A). The second torque command value τ** shown by a "dashed line" from the time t1 is generated as 120% constantly, and the output torque 100% equal to the torque command τ* can be realized by correcting the magnitude of the torque command value.

[2] In the Case of Setting of Id*<0 for Maximum Torque Control

In FIG. 22, the relationship between the output torque τ and the u-phase AC current Iu when the torque command τ* is step changed to 100% is shown.

Similarly to the case of FIG. 18, τ* is given as 100%. The second torque command value τ** shown by a "dashed line" from the time t1 is generated as 123% constantly, and the output torque 100% equal to the torque command τ* can be realized by correcting the magnitude of the torque command value.

That is, robustness against the setting error of the motor constant of the PM motor MOT can be achieved.

Next, another configuration of the torque estimation calculator used in the motor control device according to the present embodiment will be described by using FIG. 23.

Figure 23:
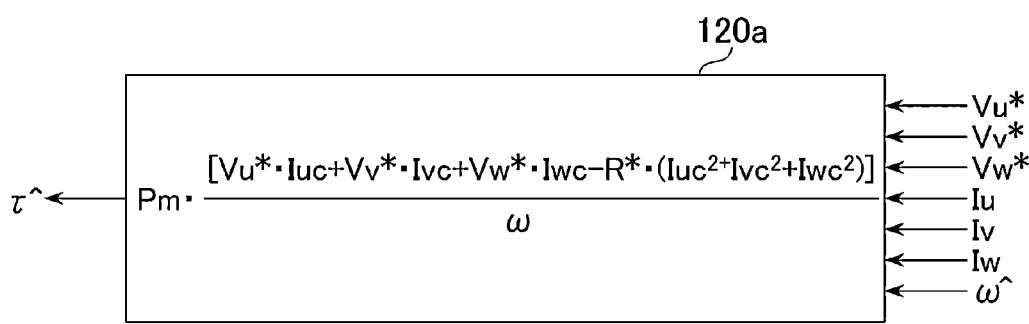
FIG. 23 is an explanatory diagram of another configuration of the torque estimation calculator used in the motor control device according to the fourth embodiment of the present invention.

FIG. 23 is an explanatory diagram of another configuration of the torque estimation calculator used in the motor control device according to the fourth embodiment of the present invention.

In the configuration shown in FIG. 19, the torque estimation calculator 120 performs the estimation calculation by using the d-axis and q-axis voltage command values and current detection values. Instead of these two values, the configuration shown in FIG. 23 may be employed. Specifically, in a torque estimation calculator 120a, an estimation calculation of the output torque τ is performed by using the three-phase voltage command values (Vu*, Vv*, Vw*) and the three-phase current detection values (Iuc, Ivc, Iwc).

Also by performing a calculation of formula (34), the output torque τ can be estimated with high accuracy equally to formula (33).

[Expression 34]

$$\tau\char`\^ = Pm \cdot \left[ \frac{Vu^* \cdot Iuc + Vv^* \cdot Ivc + Vw^* \cdot Iwc - R^{*}(Iuc^2 + Ivc^2 + Iwc^2)}{\omega} \right] \quad (34)$$

As described above, according to the present embodiment, the new second torque command value is calculated in such a manner that the torque estimate calculated from the active power value corresponds to the torque command value given from the upper level. Compensation is thereby performed in an on-line manner, and the output torque equal to the torque command value can be realized. Compensating an error including a setting error in the motor constant in this manner enables torque control with high accuracy.

Next, the configuration and operation of a motor control device according to a fifth embodiment of the present invention will be described by using FIGS. 24 and 25.

Figure 24:
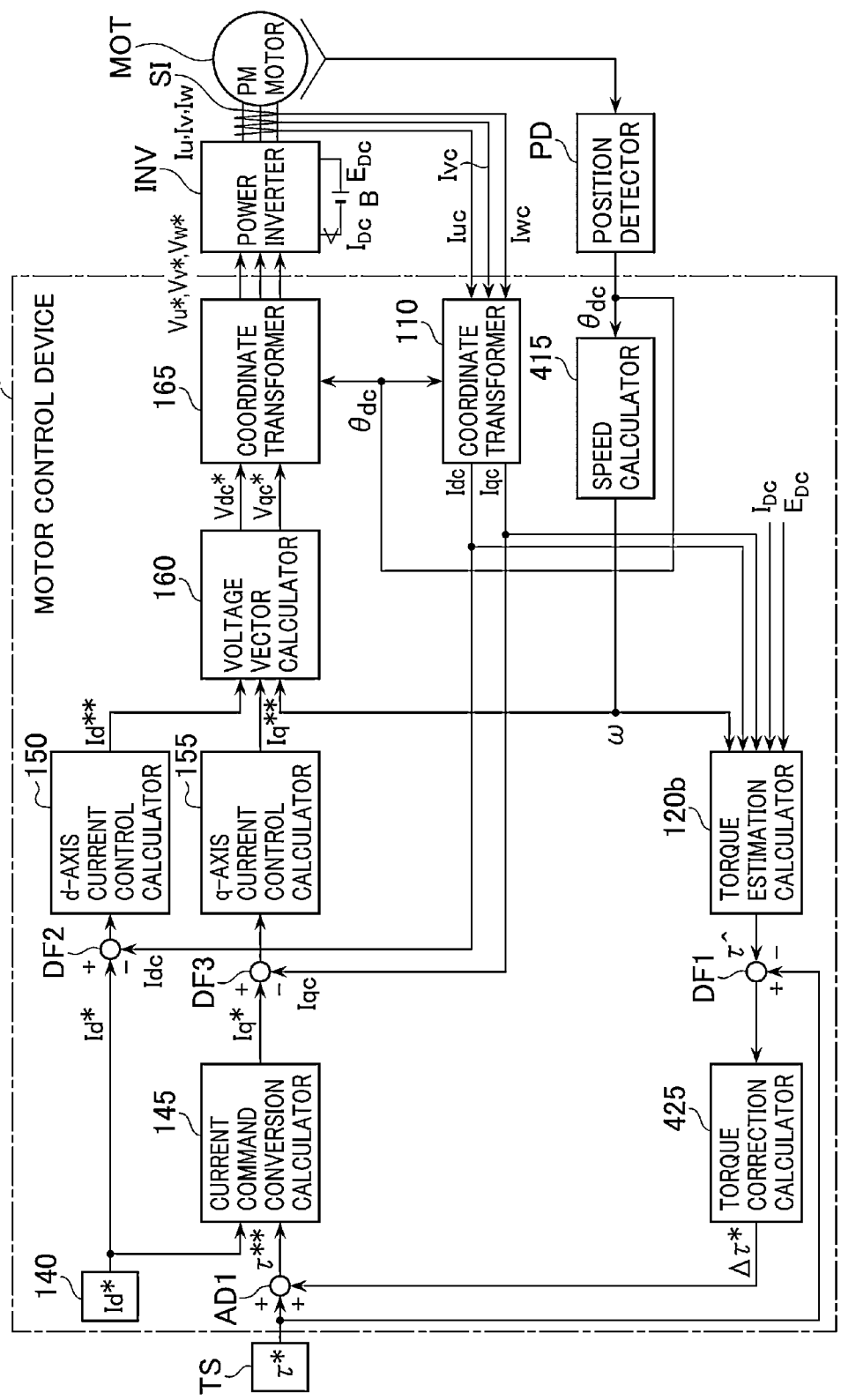
FIG. 24 explains the configuration of a motor drive system using a motor control device according to a fifth embodiment of the present invention.
Figure 25:
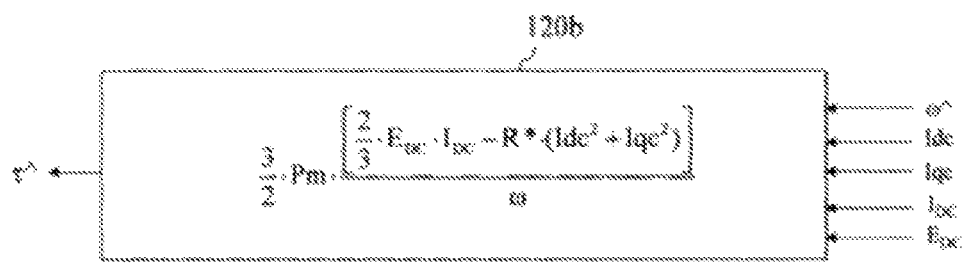
FIG. 25 is an explanatory diagram of the operation of a torque estimation calculator used in the motor control device according to the fifth embodiment of the present invention.

FIG. 24 explains the configuration of a motor drive system using the motor control device according to the fifth embodiment of the present invention. FIG. 25 is an explanatory diagram of the operation of a torque estimation calculator used in the motor control device according to the fifth embodiment of the present invention.

A motor control device 100a of the present embodiment is different from the motor control device 100 shown in FIG. 14 in that it includes a torque estimation calculator 120b instead of the torque estimation calculator 120 in the motor control device 100 in FIG. 14.

A DC power supply B supplies a DC voltage to a power inverter INV and then outputs a DC voltage EDC and a DC current IDC to the torque estimation calculator 120b.

The torque estimation calculator 120b performs estimation calculation of output torque $\tau\hat{}$ by using information on the power inverter (EDC, IDC), d-axis and q-axis current detection values (Idc, Iqc), and a speed estimate $\omega\hat{}$.

By performing a calculation of formula (35), the output torque $\tau$ of formula (28) can be estimated with high accuracy equally to formula (33).

[Expression 35]

$$\tau\hat{} = \frac{3}{2} \cdot Pm \cdot \left[ \frac{\frac{2}{3} \cdot E_{DC} \cdot I_{DC} - R^* \cdot (Idc^2 + Iqc^2)}{\omega} \right] \quad (35)$$

The present embodiment also enables torque control with high accuracy.

Next, the configuration and operation of a motor control device according to a sixth embodiment of the present invention will be described by using FIGS. 26 and 27.

Figure 26:
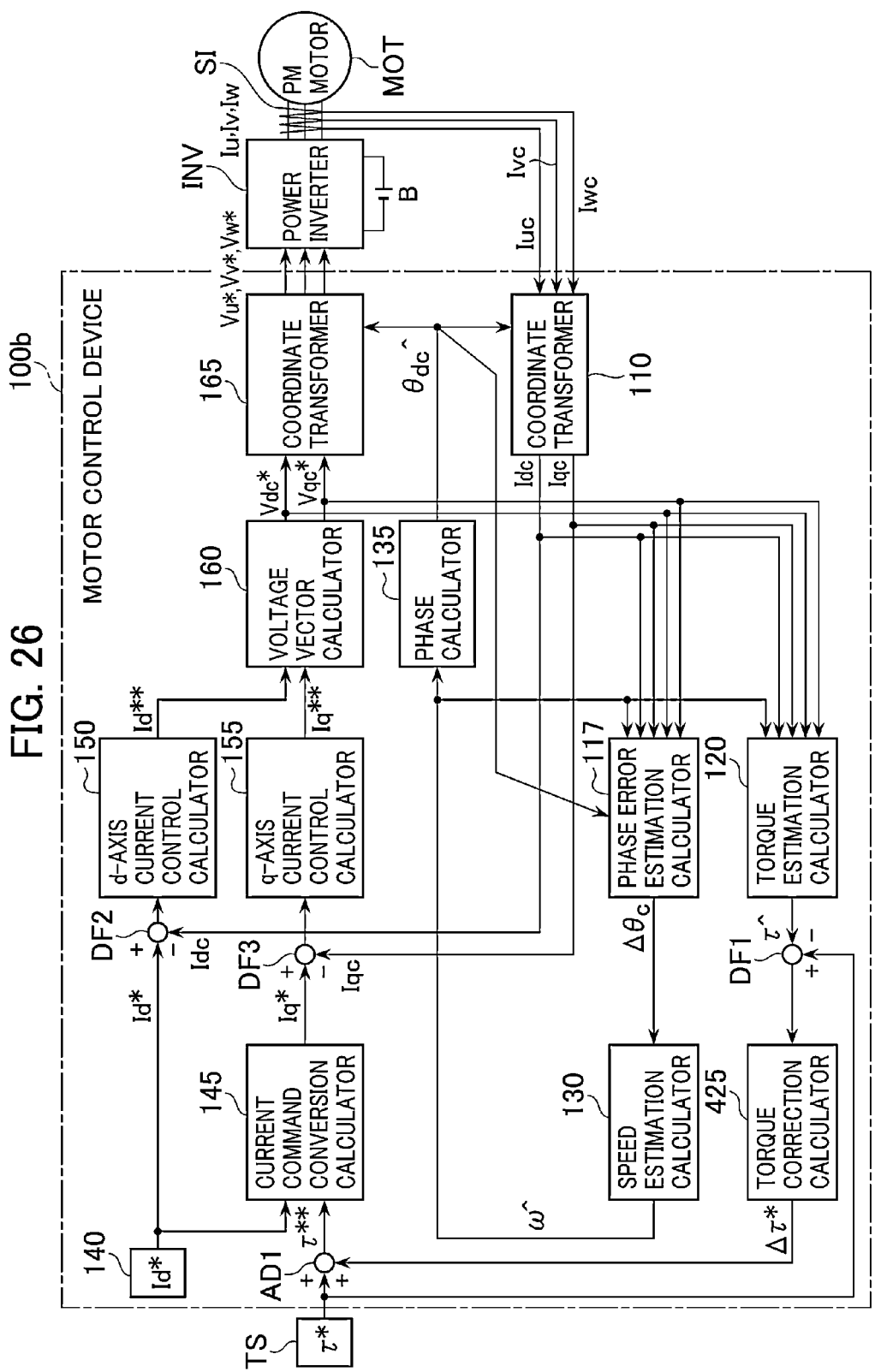
FIG. 26 explains the configuration of a motor drive system using a motor control device according to a sixth embodiment of the present invention.

FIG. 26 explains the configuration of a motor drive system using the motor control device according to the sixth embodiment of the present invention. FIG. 27 is an explanatory diagram of the operation of the motor control device according to the sixth embodiment of the present invention.

A motor control device 100b of the present embodiment is different from the motor control device 100 shown in FIG. 14 in that it is a device of a sensorless system not using the position detector PD in the motor control device 100 in FIG. 14 and includes a phase error estimation calculator 117, a speed estimation calculator 130, and a phase calculator 135 instead of the position detector PD and the speed calculator 415 in the motor control device 100 in FIG. 14.

The phase error estimation calculator 117 performs an estimation calculation of a phase error $\Delta\theta$ (=$\theta dc\hat{}-\theta$) as the deviation between a position estimate $\theta dc\hat{}$ and the position $\theta$ of a PM motor MOT based on voltage command values (Vdc*, Vqc*), current detection values (Idc, Iqc), a speed detection value $\omega$, and motor constants.

The phase error $\Delta\theta c$ as the deviation between the position estimate and the position of the motor is calculated in accordance with formula (36) based on the voltage command values (Vdc*, Vqc*), the current detection values (Idc, Iqc), the speed detection value $\omega$, and the motor constants.

[Expression 36]

$$\Delta\theta_c = \tan^{-1}\left[\frac{Vdc^* - R^* \cdot Idc + \omega\hat{} \cdot Lq^* \cdot Iqc}{Vqc^* - R^* \cdot Iqc - \omega\hat{} \cdot Lq^* \cdot Idc}\right] \quad (36)$$

The speed estimation calculator 130 performs an estimation calculation of the speed estimate $\omega\hat{}$ in such a manner as to make an estimate $\Delta\theta c$ of the phase error "zero."

The phase calculator 135 performs an integral of the speed estimate $\omega\hat{}$ to carry out an estimation calculation of the position estimate $\theta dc\hat{}$. With such a position-sensorless control system, the control device also operates similarly to the above-described embodiments.

In the control device in FIG. 14, an error is given to setting values (Lq*, Ke*) of the motor constants set in a "current command conversion calculator 145" and a "voltage vector calculator 160" with a relationship of Lq*>Lq and Ke*>Ke (the same condition as FIG. 22).

Figure 27:
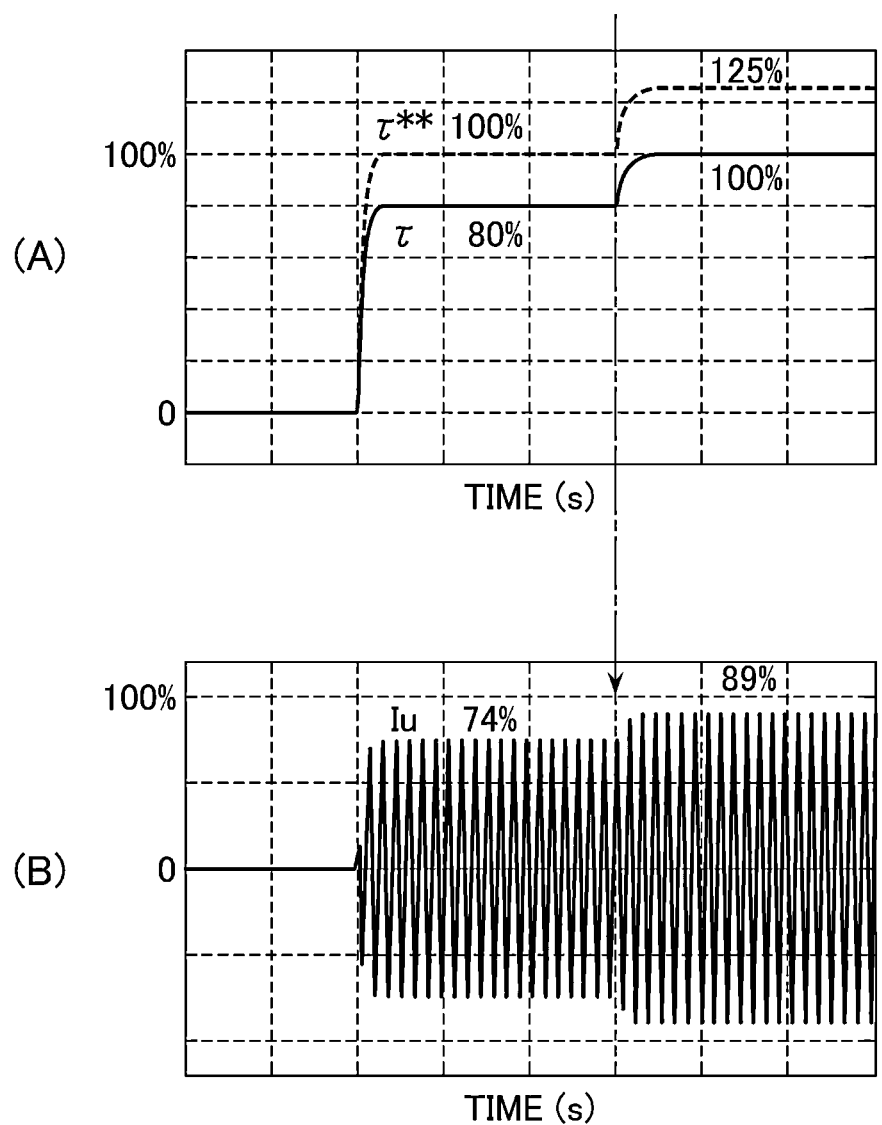
FIG. 27 is an explanatory diagram of the operation of the motor control device according to the sixth embodiment of the present invention.

FIG. 27 shows the relationship between output torque $\tau$ and a u-phase AC current Iu when a torque command $\tau^*$ is step changed to 100% in maximum torque control (setting of Id*<0).

A second torque command value $\tau^{**}$ shown by a "dashed line" from time t1 is generated as 125% constantly, and output torque 100% equal to the torque command $\tau^*$ can be achieved by correcting the magnitude of the torque command value even at the time of controlling position-sensorless.

As described above, in the case of the sensorless system, torque control with high accuracy is possible with the present embodiment.

In the above-described respective embodiments, the second torque command $\tau^{**}$ is created by adding the first torque command $\tau^*$ and the correction value $\Delta\tau^*$ of the torque command. Yet the correction value $\Delta\tau^*$ of the torque command may be directly employed as the second torque command $\tau^{**}$ without adding the first torque command $\tau^*$.

In the respective embodiments, the second current command values (Id, Iq) are created from the first current command values (Id*, Iq*) and the current detection values (Idc, Iqc). Then, a vector control calculation is performed by using these current command values.

In contrast, it is also possible to apply a vector control calculation system in which the deviation between the first current command values (Id*, Iq*) and the current detection values (Idc, Iqc) is subjected to proportional+integral calculation to create voltage correction values ($\Delta$Vd*, $\Delta$Vq*) and the voltage command values (Vdc*, Vqc*) are calculated in accordance with formula (37) by using these voltage correction values ($\Delta$Vd*, $\Delta$Vq*), the first current command values (Id*, Iq*), the speed detection value $\omega$, and the motor constants of the PM motor MOT.

[Expression 37]

$$\begin{bmatrix} Vdc^* \\ Vqc^* \end{bmatrix} = \begin{bmatrix} R^* & -\omega \cdot Ld^* \\ \omega \cdot Lq^* & R^* \end{bmatrix} \cdot \begin{bmatrix} Id^* \\ Iq^* \end{bmatrix} + \begin{bmatrix} 0 \\ \omega \cdot Ke^* \end{bmatrix} + \begin{bmatrix} \Delta Vd^* \\ \Delta Vq^* \end{bmatrix} \quad (37)$$

The embodiments can be applied also to a vector control calculation system in which the voltage command values (Vdc*, Vqc*) are calculated in accordance with formula (38) by using the first d-axis current command Id*=0, the primary delay signal Iqctd of the q-axis current detection value Iqc, a speed command value $\omega^*$, and the motor constants of the motor MOT.

[Expression 38]

$$\begin{bmatrix} Vdc^* \\ Vqc^* \end{bmatrix} = \begin{bmatrix} R^* & -\omega^* \cdot Ld^* \\ \omega^* \cdot Lq^* & R^* \end{bmatrix} \cdot \begin{bmatrix} Idc \\ Iqctd \end{bmatrix} + \begin{bmatrix} 0 \\ \omega^* \cdot Ke^* \end{bmatrix} \quad (38)$$

The respective embodiments employ a system in which the three-phase AC currents (Iu–Iw) detected by the expensive current detector SI are detected. However, they are also compatible with a "low-cost electric vehicle system" that reproduces three-phase motor currents (Iu^, Iv^, Iw^) from the DC current IDC flowing through a single-shunt resistor attached for detection of overcurrent of the power inverter INV and uses these reproduced current values.

Next, the configurations of work machines to which the motor control devices according to the respective embodiments of the present invention are applied will be described by using FIGS. 28 and 13.

Figure 28:
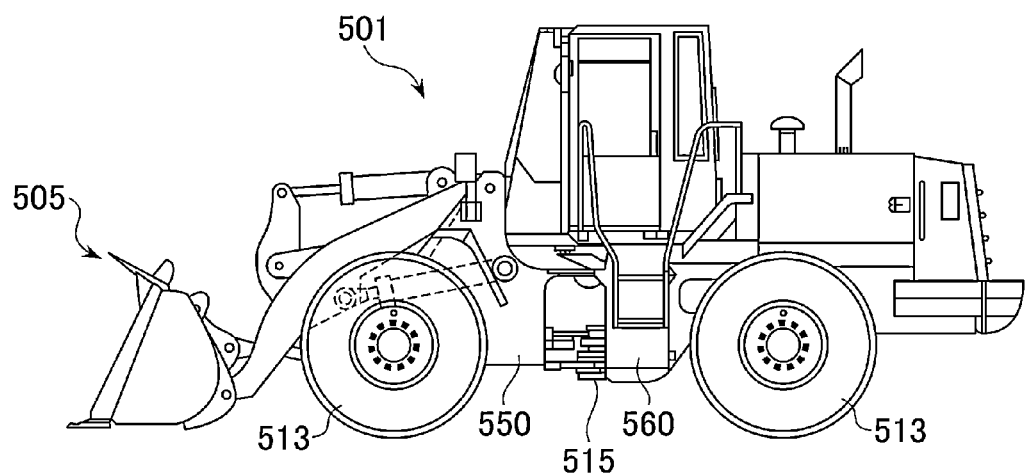
FIG. 28 is a configuration diagram of a work machine to which the motor control devices according to the respective embodiments of the present invention are applied.

FIGS. 28 and 13 are configuration diagrams of the work machines to which the motor control devices according to the respective embodiments of the present invention are applied.

FIG. 28 shows the configuration of a wheel loader as an example of work machines.

A wheel loader 501 of the present example is a vehicle of an articulated type steered by middle-bending substantially at the center of the vehicle. A center joint (CJ) 515 is incorporated into the middle-bent part of propeller shafts. In addition, the wheel loader 501 has a front frame 550 on the front side of this center joint 515 and a rear frame 560 on the rear side (see FIG. 28). Furthermore, a first electric motor (M1) and a second electric motor (M2) are disposed as electric motors for traveling on the front and rear propeller shafts, respectively, across the center joint (CJ) 515. When the electric motors for traveling rotate, the power thereof is transmitted to the propeller shafts, and wheels 513 are driven to rotate via a differential gear (Dif) and a gear (G).

A hydraulic pump operates, and a pressure oil is supplied from this hydraulic pump to hydraulic work equipment (work equipment) 505 when the engine is driven. The pressure oil supplied to the hydraulic work equipment 505 is supplied to the bucket, lift, and steering via a control valve C/V. Then, the bucket, lift, and steering can perform predetermined actions by operation of equipment such as operating lever by an operator from a cab (not shown).

The permanent magnet synchronous motor MOT controlled by the motor control device is a motor for traveling driving that drives the wheels and an assist motor that assists the engine. The motor for traveling driving uses the position detector PD such as a resolver. Therefore, the motor control device 100 shown in FIG. 14 or the motor control device 100a shown in FIG. 24 is used as the motor control device to control the motor for traveling driving. The assist motor does not use the position detector PD. Therefore, the motor control device 100b shown in FIG. 26 is used as the motor control device to control the assist motor.

As another example, the motor control device 100 shown in FIG. 14 and the motor control device 100a shown in FIG. 24 are usable as the motor control device to control the motor for traveling driving and the motor control device to control the assist motor, respectively.

The motor control device can be applied also to the configuration of the hydraulic excavator 301 of FIG. 13 as another example of work machines.

The hydraulic excavator 301 of a crawler type as a construction machine is roughly composed of the undercarriage 302 capable of being self-propelled, the upper revolving body 303 that is revolvably mounted on this undercarriage 302 and forms the vehicle body along with the undercarriage 302, and the work equipment 304. The work equipment 304 is provided on the front side of this upper revolving body 303 in such a manner as to be capable of looking up/down and carries out works including soil excavation works. The revolving frame 305 of the upper revolving body 303 is formed as a vehicle body frame composed of a support structure body.

The permanent magnet synchronous motor MOT controlled by the motor control device is a revolving motor for revolving the upper revolving body 303 relative to the undercarriage 302 and an assist motor that assists the engine. The revolving motor uses the position detector PD such as a resolver. Therefore, the motor control device 100 shown in FIG. 14 or the motor control device 100a shown in FIG. 24 is used as the motor control device to control the revolving motor. The assist motor does not use the position detector PD. Therefore, the motor control device 100b shown in FIG. 26 is used as the motor control device to control the assist motor.

As another example, the motor control device 100 shown in FIG. 14 and the motor control device 100a shown in FIG. 24 can be used as the motor control device to control the revolving motor and the motor control device to control the assist motor.

DESCRIPTION OF NUMERALS

B . . . DC power supply
INV . . . power inverter
MOT . . . permanent magnet synchronous motor
SI . . . current detector
TS . . . torque command setter
100, 100a, 100b . . . motor control device
110 . . . coordinate transformer
115, 115a, 117 . . . phase error estimation calculator
120, 120a, 120b . . . torque estimation calculator
125 . . . phase error command calculator
125a . . . q-axis inductance correction calculator
130 . . . speed estimation calculator
135 . . . phase calculator
140 . . . d-axis current command setter
145 . . . current command conversion calculator
150 . . . d-axis current control calculator
155 . . . q-axis current control calculator
160 . . . voltage vector calculator
165 . . . coordinate transformer
170 . . . phase error command value setter
415 . . . speed calculator
425 . . . torque correction calculator

The invention claimed is:

1. A motor control device having a controller that estimates torque output by a motor in such a manner that a current command value obtained from a torque command value to the motor corresponds to a current detection value regarding the current supplied to the motor via a power inverter, and controls the current supplied to the motor in such a manner that a torque estimate of the motor obtained by the estimation corresponds to the torque command value, wherein the controller includes a torque estimation calculator that estimates the torque output by the motor based on an active power supplied to the motor or the power inverter, a voltage vector calculator that calculates a voltage command value based on the current command value, the current detection value, a speed estimate, and a setting value of a motor constant, a phase error estimation calculator that outputs a phase error estimate that is an estimate of a phase error as a deviation between an estimate of a rotational phase of the motor and a rotational phase value of the motor based on the voltage command value output by the voltage vector calculator, the speed estimate, the current detection value, and the setting value of the motor constant, a phase error command calculator that calculates a command value of the phase error from a deviation between the torque estimate obtained by the estimation by the torque estimation calculator and the torque command value, and a speed estimation calculator that outputs the speed estimate in such a manner that the phase error estimate output by the phase error estimation calculator corresponds to the command value of the phase error output by the phase error command calculator, wherein the torque estimation calculator subtracts, from a first power signal obtained by adding a product of a d-axis voltage command value output by the voltage vector calculator and a d-axis current detection value obtained from the current detection value by coordinate transformation to a product of a q-axis voltage command value output by the voltage vector calculator and a q-axis current detection value obtained from the current detection value by coordinate transformation, a second power signal obtained by adding a square of the d-axis current detection value to a square of the q-axis current detection value and multiplying a value resulting from the addition by a resistance value of the motor, and the torque estimation calculator divides a value resulting from the subtraction by the speed estimate and multiples the result of the division by a constant to calculate the torque estimate.

2. The motor control device according to claim 1, wherein the phase error estimation calculator multiples, by an integral gain, the deviation between the torque estimate obtained by the estimation by the torque estimation calculator and the torque command value and performs integral calculation to calculate the command value of the phase error.

3. A motor control device having a controller that estimates torque output by a motor in such a manner that a current command value obtained from a torque command value to the motor corresponds to a current detection value regarding the current supplied to the motor via a power inverter, and controls the current supplied to the motor in such a manner that a torque estimate of the motor obtained by the estimation corresponds to the torque command value, wherein the controller includes a torque estimation calculator that estimates the torque output by the motor based on an active power supplied to the motor or the power inverter, a voltage vector calculator that calculates a voltage command value based on the current command value, the current detection value, a speed estimate, and a setting value of a motor constant, a phase error estimation calculator that outputs a phase error estimate that is an estimate of a phase error as a deviation between an estimate of a rotational phase of the motor and a rotational phase value of the motor based on the voltage command value output by the voltage vector calculator, the speed estimate, the current detection value, and the setting value of the motor constant, a phase error command calculator that calculates a command value of the phase error from a deviation between the torque estimate obtained by the estimation by the torque estimation calculator and the torque command value, and a speed estimation calculator that outputs the speed estimate in such a manner that the phase error estimate output by the phase error estimation calculator corresponds to the command value of the phase error output by the phase error command calculator, wherein the torque estimation calculator subtracts, from a first power signal obtained by multiplying a three-phase voltage command value to the power inverter by a three-phase current detection value for each of three phases and adding products of the multiplication to each other, a second power signal obtained by squaring the three-phase current detection value for each phase to add squares to each other and multiplying a value resulting from the addition by a resistance value of the motor, and the torque estimation calculator divides a value resulting from the subtraction by the speed estimate and multiples the result of the division by a constant to calculate the torque estimate.

4. A motor control device having a controller that estimates torque output by a motor in such a manner that a current command value obtained from a torque command value to the motor corresponds to a current detection value regarding the current supplied to the motor via a power inverter, and controls the current supplied to the motor in such a manner that a torque estimate of the motor obtained by the estimation corresponds to the torque command value, wherein the controller includes a torque estimation calculator that estimates the torque output by the motor based on an active power supplied to the motor or the power inverter, a voltage vector calculator that calculates a voltage command value based on the current command value, the current detection value, a speed estimate, and a setting value of a motor constant, a phase error estimation calculator that outputs a phase error estimate that is an estimate of a phase error as a deviation between an estimate of a rotational phase of the motor and a rotational phase value of the motor based on the voltage command value output by the voltage vector calculator, the speed estimate, the current detection value, and the setting value of the motor constant, a phase error command calculator that calculates a command value of the phase error from a deviation between the torque estimate obtained by the estimation by the torque estimation calculator and the torque command value, and a speed estimation calculator that outputs the speed estimate in such a manner that the phase error estimate output by the phase error estimation calculator corresponds to the command value of the phase error output by the phase error command calculator, wherein the torque estimation calculator subtracts, from a first power signal obtained by multiplying a DC voltage and a DC current of the power inverter and multiplying the result of the multiplication by a constant, a second power signal obtained by adding a square of a d-axis current detection value obtained from the current detection value by coordinate transformation to a square of a q-axis current detection value and multiplying a value obtained from the current detection value by coordinate transformation resulting from the addition by a resistance value of the motor, and the torque estimation calculator divides a value resulting from the subtraction by the speed estimate and multiples the result of the division by a constant to calculate the torque estimate.

* * * * *